US008935512B2

(12) United States Patent
Kumura

(10) Patent No.: US 8,935,512 B2
(45) Date of Patent: Jan. 13, 2015

(54) INSTRUCTION OPERATION CODE GENERATION SYSTEM

(75) Inventor: Takahiro Kumura, Tokyo (JP)

(73) Assignee: NEC Corporation, Tokyo (JP)

( * ) Notice: Subject to any disclaimer, the term of this patent is extended or adjusted under 35 U.S.C. 154(b) by 1115 days.

(21) Appl. No.: 12/515,439

(22) PCT Filed: Nov. 19, 2007

(86) PCT No.: PCT/JP2007/072413
§ 371 (c)(1),
(2), (4) Date: May 19, 2009

(87) PCT Pub. No.: WO2008/062768
PCT Pub. Date: May 29, 2008

(65) Prior Publication Data
US 2010/0037039 A1    Feb. 11, 2010

(30) Foreign Application Priority Data

Nov. 21, 2006  (JP) .................................. 2006-314260

(51) Int. Cl.
*G06F 9/30* (2006.01)
*G06F 9/40* (2006.01)
*G06F 7/38* (2006.01)
(Continued)

(52) U.S. Cl.
CPC .................................. *G06F 9/30145* (2013.01)
USPC ............ 712/210; 712/208; 712/209; 712/213

(58) Field of Classification Search
USPC ......... 717/140, 136–139; 703/26–27; 712/32, 712/42, 200, 209, 210, 213, 226
See application file for complete search history.

(56) References Cited

U.S. PATENT DOCUMENTS 5,493,508 A * 2/1996 Dangelo et al. ................ 716/103
5,560,028 A * 9/1996 Sachs et al. ...................... 712/23
(Continued)

FOREIGN PATENT DOCUMENTS

GB      2308470 A  *  6/1997
JP      2003518280 A      6/2003
(Continued)

OTHER PUBLICATIONS

Mehrdad Reshadi, Prabhat Mishra, Nikil Dutt "Instruction Set Compiled Simulation: A Technique for Fast and Flexible Instruction Set Simulation." Design Automation Conference. Jun. 2-6, 2003. pp. 758-763.*

(Continued)

*Primary Examiner* — Lewis A Bullock, Jr.
*Assistant Examiner* — Keith C Yuen
(74) *Attorney, Agent, or Firm* — Sughrue Mion, PLLC

(57) ABSTRACT

It is possible to increase the processor instruction set design job efficiency and reduce workload on designers in investigation of an instruction set. An instruction operation code generation system includes an operation code bit width decision means, an instruction sorting means, and an operation code value decision means. The operation code bit width decision means decides a bit width that can be assigned for an operation code of each instruction according to specification data associated with a processor instruction set. The instruction sorting means sorts the instructions according to the operation code bit width. The operation code value decision means decides the value of the operation code of each instruction.

16 Claims, 18 Drawing Sheets

(51) Int. Cl.
  *G06F 9/00* (2006.01)
  *G06F 9/44* (2006.01)
  *G06F 15/00* (2006.01)
  *G06F 15/76* (2006.01)

(56) References Cited

U.S. PATENT DOCUMENTS

| | | | |
|---|---|---|---|
| 5,604,876 A * | 2/1997 | Matsui | 712/210 |
| 5,636,352 A * | 6/1997 | Bealkowski et al. | 712/208 |
| 5,809,273 A * | 9/1998 | Favor et al. | 712/210 |
| 5,964,861 A * | 10/1999 | Gabzdyl et al. | 712/23 |
| 6,457,173 B1 * | 9/2002 | Gupta et al. | 717/149 |
| 6,477,683 B1 | 11/2002 | Killian et al. | |
| 6,862,563 B1 | 3/2005 | Hakewill et al. | |
| 6,948,051 B2 * | 9/2005 | Rivers et al. | 712/200 |
| 7,051,189 B2 * | 5/2006 | Warnes | 712/210 |
| 7,069,420 B1 * | 6/2006 | Overkamp et al. | 712/208 |
| 2002/0120914 A1 * | 8/2002 | Gupta et al. | 716/17 |
| 2004/0162964 A1 * | 8/2004 | Ota et al. | 712/200 |
| 2004/0243983 A1 * | 12/2004 | Kumura | 717/136 |
| 2006/0101369 A1 | 5/2006 | Wang et al. | |
| 2007/0038984 A1 * | 2/2007 | Gschwind et al. | 717/136 |
| 2007/0101101 A1 * | 5/2007 | Odahara et al. | 712/210 |

FOREIGN PATENT DOCUMENTS

| | | |
|---|---|---|
| JP | 2003241975 A | 8/2003 |
| JP | 2003288203 A | 10/2003 |
| JP | 2003323463 A | 11/2003 |
| JP | 2005293448 A | 10/2005 |
| TW | 539965 B | 7/2003 |
| TW | 571206 B | 1/2004 |
| WO | 0046704 A2 | 8/2000 |

OTHER PUBLICATIONS

Achim Nohl, Volker Greive, Gunnar Braun, Andreas Hoffmann, Rainer Leupers, Oliver Schliebusch, and Heinrich Meyr. "Instruction Encoding Synthesis for Architecture Exploration using Hierarchical Processor Models". ACM Design Automation Conference, Jun. 2-6, 2003. pp. 262-267.*

Jong-eun Lee, Kiyoung Choi, and Nikil Butt. "Efficient Instruction Encoding for Automatic Instruction Set Design of Configurable ASIPs". IEEE/ACM International Conference on Computer Aided Design, Nov. 10-14, 2002. pp. 649-654.*

L. Benini, G. DeMicheli, A. Macii, E. Macii and M. Poncino. "Automatic Selection of Instruction Op-Codes of Low-Power Core Processors". Proc. Inst. Electr. Eng.—Comput. Digit. Tech. vol. 146, No. 4, pp. 173-178. 1999.*

S. Pees et al., "LISA—Machine Description Language for Cycle-Accurate Models of Programmable DSP Architectures", 36th Design Automation Conference (DAC 99), Jun. 1999, p. 933-938.

A. Hoffmann et al., "A Survey on Modeling Issues Using the Machine Description Language LISA", Proceedings of ICASSP 2001, vol. 2, May 7-11, 2001, p. 1137-1140.

L. Benini, "Automatic selection of instruction op-codes of low-power core processors", IEE Proceedings Computers & Digital Techniques, vol. 146, No. 4, Jul. 1999, p. 173-178.

K. Inoue et al., "Reducing Power Consumption of Instruction Roms by Exploiting Instruction Frequency", Circuits and Systems, 2002. APCCAS 02. 2002 Asia-pacific Conference on, IEEE, vol. 2, Oct. 2002, pp. 1-6.

A. Nohl et al., "Instruction Encoding Synthesis for Architecture Exploration using Hierarchical Processor Models", Design Automation Conference, IEEE, XP002635651, 2003, pp. 262-267.

Jong-Eun Lee et al., "Efficient Instruction Encoding for Automatic Instruction Set Design of Configurable ASIPs", IEEE/ACM International Conference on Computer Aided Design, IEEE/ACM Digest of Technical Papers, XP002635652, 2002, pp. 649-654.

Taiwanese Office Action for TW96143956 on Jun. 6, 2012.

* cited by examiner

FIG. 6

|  | k | MSB 15 | 14 | 13 | 12 | 11 | 10 | 9 | 8 | 7 | 6 | 5 | 4 | 3 | 2 | 1 | LSB 0 | total_operands_length[k] |
|---|---|---|---|---|---|---|---|---|---|---|---|---|---|---|---|---|---|---|
| INSTRUCTION U | 0 |  |  |  |  |  |  |  |  |  |  | Rb | Rb |  | Ra | Ra | Ra | 6 |
| INSTRUCTION V | 1 |  |  |  |  |  |  |  |  |  |  | Rb | Rb |  | Ra | Ra | Ra | 6 |
| INSTRUCTION W | 2 |  |  |  |  |  |  |  |  |  |  | Rb | Rb |  | Ra | Ra | Ra | 6 |
| INSTRUCTION A | 3 |  |  |  | IMM4 | IMM4 | IMM4 | IMM4 | Rc | Rc |  | Rb | Rb |  | Ra | Ra | Ra | 13 |
| INSTRUCTION B | 4 |  |  |  | IMM4 | IMM4 | IMM4 | IMM4 | Rc | Rc |  | Rb | Rb |  | Ra | Ra | Ra | 13 |
| INSTRUCTION C | 5 |  |  |  |  | IMM6 | IMM6 | IMM6 | IMM6 | IMM6 | IMM6 | Rb | Rb |  | Ra | Ra | Ra | 12 |
| INSTRUCTION D | 6 |  |  |  |  | IMM6 | IMM6 | IMM6 | IMM6 | IMM6 | IMM6 | Rb | Rb |  | Ra | Ra | Ra | 12 |
| INSTRUCTION E | 7 |  |  |  |  | IMM6 | IMM6 | IMM6 | IMM6 | IMM6 | IMM6 | Rb | Rb |  | Ra | Ra | Ra | 12 |
| INSTRUCTION F | 8 |  |  |  |  | IMM2 | IMM2 | Rc | Rc |  |  | Rb | Rb |  | Ra | Ra | Ra | 11 |
| INSTRUCTION G | 9 |  |  |  |  |  |  | Rc | Rc |  |  | Rb | Rb |  | Ra | Ra | Ra | 9 |
| INSTRUCTION H | 10 |  |  |  |  |  |  | Rc | Rc |  |  | Rb | Rb |  | Ra | Ra | Ra | 9 |
| INSTRUCTION P | 11 |  |  |  |  |  |  | Rc | Rc |  |  | Rb | Rb |  | Ra | Ra | Ra | 9 |
| INSTRUCTION Q | 12 |  |  |  |  |  |  | Rc | Rc |  |  | Rb | Rb |  | Ra | Ra | Ra | 9 |
| INSTRUCTION T | 13 |  |  |  |  |  |  | Rc | Rc |  |  | Rb | Rb |  | Ra | Ra | Ra | 9 |

Ra, Rb, Rc, IMM4, IMM6, AND IMM2 EACH REPRESENT OPERAND DEFINED IN SPECIFICATION DATA.
SUM OF BIT WIDTHS OF THESE OPERANDS BECOMES total_operands_length[k].

FIG. 7

| i | | 15 | 14 | 13 | 12 | 11 | 10 | 9 | 8 | 7 | 6 | 5 | 4 | 3 | 2 | 1 | 0 | opcode_length[i] | opcode_value[i] |
|---|---|---|---|---|---|---|---|---|---|---|---|---|---|---|---|---|---|---|---|
| INSTRUCTION A | 0 | 0 | 0 | 0 | IMM4 | | | | Rc | | Rb | | | Ra | | | | 3 | 0b000 |
| INSTRUCTION B | 1 | 0 | 0 | 1 | IMM4 | | | | Rc | | Rb | | | Ra | | | | 3 | 0b001 |
| INSTRUCTION C | 2 | 0 | 1 | 0 | 0 | IMM6 | | | | | Rb | | | Ra | | | | 4 | 0b0100 |
| INSTRUCTION D | 3 | 0 | 1 | 0 | 1 | IMM6 | | | | | Rb | | | Ra | | | | 4 | 0b0101 |
| INSTRUCTION E | 4 | 0 | 1 | 1 | 0 | IMM6 | | | | | Rb | | | Ra | | | | 4 | 0b0110 |
| INSTRUCTION F | 5 | 0 | 1 | 1 | 1 | 0 | IMM2 | | Rc | | Rb | | | Ra | | | | 5 | 0b01110 |
| INSTRUCTION G | 6 | 0 | 1 | 1 | 1 | 1 | 1 | 0 | 0 | | Rb | | | Ra | | | | 7 | 0b0111100 |
| INSTRUCTION H | 7 | 0 | 1 | 1 | 1 | 1 | 1 | 0 | 1 | | Rb | | | Ra | | | | 7 | 0b0111101 |
| INSTRUCTION P | 8 | 0 | 1 | 1 | 1 | 1 | 1 | 1 | 0 | | Rb | | | Ra | | | | 7 | 0b0111110 |
| INSTRUCTION Q | 9 | 0 | 1 | 1 | 1 | 1 | 1 | 1 | 1 | | Rb | | | Ra | | | | 7 | 0b0111111 |
| INSTRUCTION T | 10 | 1 | 0 | 0 | 0 | 0 | 0 | 0 | 0 | | Rb | | | Ra | | | | 7 | 0b1000000 |
| INSTRUCTION U | 11 | 1 | 0 | 0 | 0 | 0 | 0 | 0 | 1 | 0 | 0 | Rb | | | Ra | | | 10 | 0b1000001000 |
| INSTRUCTION V | 12 | 1 | 0 | 0 | 0 | 0 | 0 | 0 | 1 | 0 | 1 | Rb | | | Ra | | | 10 | 0b1000001001 |
| INSTRUCTION W | 13 | 1 | 0 | 0 | 0 | 0 | 0 | 0 | 1 | 1 | 0 | Rb | | | Ra | | | 10 | 0b1000001010 |

MSB ← → LSB

BIT PATTERN (SHADED PORTION) CONSISTING OF 0 AND 1 OF EACH ROW REPRESENTS opcode_value[i] OF OPERATION CODE OF EACH INSTRUCTION

FIG. 9

|  | i | 15 | 14 | 13 | 12 | 11 | 10 | 9 | 8 | 7 | 6 | 5 | 4 | 3 | 2 | 1 | 0 | opcode_length[i] | opcode_value[i] |
|---|---|---|---|---|---|---|---|---|---|---|---|---|---|---|---|---|---|---|---|
| INSTRUCTION A | 0 | 0 | 0 | 0 | IMM4 | | | Rc | | | Rb | | | Ra | | | | 3 | 0b000 |
| INSTRUCTION B | 1 | 0 | 0 | 1 | IMM4 | | | Rc | | | Rb | | | Ra | | | | 3 | 0b001 |
| INSTRUCTION C | 2 | 0 | 1 | 0 | 0 | IMM6 | | | | | Rb | | | Ra | | | | 4 | 0b0100 |
| INSTRUCTION D | 3 | 0 | 1 | 0 | 1 | IMM6 | | | | | Rb | | | Ra | | | | 4 | 0b0101 |
| INSTRUCTION E | 4 | 0 | 1 | 1 | 0 | IMM6 | | | | | Rb | | | Ra | | | | 4 | 0b0110 |
| INSTRUCTION F | 5 | 0 | 1 | 1 | 1 | 0 | IMM2 | | Rc | | | Rb | | | Ra | | | 5 | 0b01110 |
| INSTRUCTION G | 6 | 1 | 0 | 0 | 0 | 0 | 0 | 0 | Rc | | | Rb | | | Ra | | | 7 | 0b1000000 |
| INSTRUCTION H | 7 | 1 | 0 | 0 | 0 | 0 | 0 | 1 | Rc | | | Rb | | | Ra | | | 7 | 0b1000001 |
| INSTRUCTION P | 8 | 1 | 0 | 0 | 0 | 0 | 1 | 0 | Rc | | | Rb | | | Ra | | | 7 | 0b1000010 |
| INSTRUCTION Q | 9 | 1 | 0 | 0 | 0 | 0 | 1 | 1 | Rc | | | Rb | | | Ra | | | 7 | 0b1000011 |
| INSTRUCTION T | 10 | 1 | 0 | 0 | 0 | 1 | 0 | 0 | 0 | 0 | 0 | Rb | | | Ra | | | 10 | 0b1000100100 |
| INSTRUCTION U | 11 | 1 | 0 | 0 | 0 | 1 | 0 | 1 | 0 | 0 | 0 | Rb | | | Ra | | | 10 | 0b1000101000 |
| INSTRUCTION V | 12 | 1 | 0 | 0 | 0 | 1 | 0 | 1 | 0 | 0 | 1 | Rb | | | Ra | | | 10 | 0b1000101001 |
| INSTRUCTION W | 13 | 1 | 0 | 0 | 0 | 1 | 0 | 1 | 0 | 1 | 0 | Rb | | | Ra | | | 10 | 0b1000101010 |

MSB ← → LSB

BIT PATTERN (SHADED PORTION) CONSISTING OF 0 AND 1 OF EACH ROW REPRESENTS opcode_value[i] OF OPERATION CODE OF EACH INSTRUCTION

FIG. 11

| i | Instruction | 15 (MSB) | 14 | 13 | 12 | 11 | 10 | 9 | 8 | 7 | 6 | 5 | 4 | 3 | 2 | 1 | 0 (LSB) | opcode_length[i] | opcode_value[i] |
|---|---|---|---|---|---|---|---|---|---|---|---|---|---|---|---|---|---|---|---|
| 0 | INSTRUCTION A | 0 | 0 | 0 | IMM4 | | | | Rc | | Rb | | | Ra | | | | 3 | 0b000 |
| 1 | INSTRUCTION B | 0 | 0 | 1 | IMM4 | | | | Rc | | Rb | | | Ra | | | | 3 | 0b001 |
| 2 | INSTRUCTION C | 0 | 1 | 1 | 0 | IMM6 | | | | | | Rb | | | Ra | | | 4 | 0b0110 |
| 3 | INSTRUCTION D | 0 | 1 | 1 | 1 | IMM6 | | | | | | Rb | | | Ra | | | 4 | 0b0111 |
| 4 | INSTRUCTION E | 1 | 0 | 0 | 0 | IMM6 | | | | | | Rb | | | Ra | | | 4 | 0b1000 |
| 5 | INSTRUCTION F | 1 | 1 | 0 | 0 | 0 | IMM2 | | Rc | | Rb | | | Ra | | | | 5 | 0b11000 |
| 6 | INSTRUCTION G | 1 | 1 | 0 | 0 | 1 | 0 | 0 | Rc | | Rb | | | Ra | | | | 7 | 0b1100100 |
| 7 | INSTRUCTION H | 1 | 1 | 0 | 0 | 1 | 0 | 1 | Rc | | Rb | | | Ra | | | | 7 | 0b1100101 |
| 8 | INSTRUCTION P | 1 | 1 | 0 | 0 | 1 | 1 | 0 | Rc | | Rb | | | Ra | | | | 7 | 0b1100110 |
| 9 | INSTRUCTION Q | 1 | 1 | 0 | 0 | 1 | 1 | 1 | Rc | | Rb | | | Ra | | | | 7 | 0b1100111 |
| 10 | INSTRUCTION T | 1 | 1 | 0 | 1 | 0 | 0 | 0 | Ra | | Rb | | | Ra | | | | 7 | 0b1101000 |
| 11 | INSTRUCTION U | 1 | 1 | 1 | 0 | 0 | 0 | 0 | 0 | 0 | 0 | Rb | | | Ra | | | 10 | 0b1110000000 |
| 12 | INSTRUCTION V | 1 | 1 | 1 | 0 | 0 | 0 | 0 | 0 | 0 | 1 | Rb | | | Ra | | | 10 | 0b1110000001 |
| 13 | INSTRUCTION W | 1 | 1 | 1 | 0 | 0 | 0 | 0 | 0 | 1 | 0 | Rb | | | Ra | | | 10 | 0b1110000010 |

BIT PATTERN (SHADED PORTION) CONSISTING OF 0 AND 1 OF EACH ROW REPRESENTS opcode_value[i] OF OPERATION CODE OF EACH INSTRUCTION

FIG. 15

| k | Instruction | 15 MSB | 14 | 13 | 12 | 11 | 10 | 9 | 8 | 7 | 6 | 5 | 4 | 3 | 2 | 1 | 0 LSB | total_operands_length[k] |
|---|---|---|---|---|---|---|---|---|---|---|---|---|---|---|---|---|---|---|
| 0 | INSTRUCTION U | | | | | | | | | | | | | | | | | 6 |
| 1 | INSTRUCTION V | | | | | | | | | | | Rb | Rb | | Ra | Ra | | 6 |
| 2 | INSTRUCTION W | | | | | | | | | | | Rb | Rb | | Ra | Ra | | 6 |
| 3 | INSTRUCTION A | | | | IMM4 | IMM4 | IMM4 | IMM4 | Rc | Rc | | Rb | Rb | | Ra | Ra | | 13 |
| 4 | INSTRUCTION B | | | | IMM4 | IMM4 | IMM4 | IMM4 | Rc | Rc | | Rb | Rb | | Ra | Ra | | 13 |
| 5 | INSTRUCTION C | | | | | IMM6 | IMM6 | IMM6 | IMM6 | IMM6 | IMM6 | Rb | Rb | | Ra | Ra | | 12 |
| 6 | INSTRUCTION D | | | | | IMM6 | IMM6 | IMM6 | IMM6 | IMM6 | IMM6 | Rb | Rb | | Ra | Ra | | 12 |
| 7 | INSTRUCTION E | | | | | IMM6 | IMM6 | IMM6 | IMM6 | IMM6 | IMM6 | Rb | Rb | | Ra | Ra | | 12 |
| 8 | INSTRUCTION F | | | | | | IMM4 | IMM4 | IMM4 | IMM4 | | Rb | Rb | | Ra | Ra | | 10 |
| 9 | INSTRUCTION G | | | | | | | | Rs | Rs | | Rb | Rb | | Ra | Ra | | 9 |
| 10 | INSTRUCTION H | | | | | | | | Rc | Rc | | Rb | Rb | | Ra | Ra | | 9 |
| 11 | INSTRUCTION P | | | | | | | | Rc | Rc | | Rb | Rb | | Ra | Ra | | 9 |
| 12 | INSTRUCTION Q | | | | | | | | Rc | Rc | | Rb | Rb | | Ra | Ra | | 9 |
| 13 | INSTRUCTION T | | | | | | | | Rs | Rs | | Rb | Rb | | Ra | Ra | | 9 |

Ra, Rb, Rc, IMM4, AND IMM6, EACH REPRESENT OPERAND DEFINED IN SPECIFICATION DATA. SUM OF BIT WIDTHS OF THESE OPERANDS BECOMES total_operands_length[k].

FIG. 16

| i | | | | | | | | | | | | | | | | | opcode_sub_idx_value[] |
|---|---|---|---|---|---|---|---|---|---|---|---|---|---|---|---|---|---|
| | MSB 15 | 14 | 13 | 12 | 11 | 10 | 9 | 8 | 7 | 6 | 5 | 4 | 3 | 2 | 1 | LSB 0 | |
| INSTRUCTION A | | | 0 | IMM4 | | | | Rc | | | Rb | | | Ra | | | 0b0 |
| INSTRUCTION B | | | 1 | IMM4 | | | | Rc | | | Rb | | | Ra | | | 0b1 |
| INSTRUCTION C | | | 0 | 0 | IMM6 | | | | | | Rb | | | Ra | | | 0b00 |
| INSTRUCTION D | | | 0 | 1 | IMM6 | | | | | | Rb | | | Ra | | | 0b01 |
| INSTRUCTION E | | | 1 | 0 | IMM6 | | | | | | Rb | | | Ra | | | 0b10 |
| INSTRUCTION F | | | | | | 0 | IMM4 | | | | Rb | | | Ra | | | 0b0 |
| INSTRUCTION G | | | | | | 0 | 0 | Rc | | | Rb | | | Ra | | | 0b000 |
| INSTRUCTION H | | | | | | 0 | 0 | 1 | Rc | | | Rb | | | Ra | | | 0b001 |
| INSTRUCTION P | | | | | | 0 | 1 | 0 | Rc | | | Rb | | | Ra | | | 0b010 |
| INSTRUCTION Q | | | | | | 0 | 1 | 1 | Rc | | | Rb | | | Ra | | | 0b011 |
| INSTRUCTION T | | | | | | 1 | 0 | 0 | Rc | | | Rb | | | Ra | | | 0b100 |
| INSTRUCTION U | | | | | | | | | 0 | 0 | Rb | | | Ra | | | 0b00 |
| INSTRUCTION V | | | | | | | | | 0 | 1 | Rb | | | Ra | | | 0b01 |
| INSTRUCTION W | | | | | | | | | 1 | 0 | Rb | | | Ra | | | 0b10 |

BIT PATTERN (SHADED PORTION) CONSISTING OF 0 AND 1 OF EACH ROW REPRESENTS opcode_sub_idx_value[i] OF INDEX SUB-FIELD OF EACH INSTRUCTION

FIG. 17

| n | Instruction | 15 MSB | 14 | 13 | 12 | 11 | 10 | 9 | 8 | 7 | 6 | 5 | 4 | 3 | 2 | 1 | 0 LSB | opcode_sub_grp_length[n] |
|---|---|---|---|---|---|---|---|---|---|---|---|---|---|---|---|---|---|---|
| 0 | INSTRUCTION A | | | 0 | IMM4 | | | Rc | | | Rb | | | Ra | | | 2 |
| 1 | INSTRUCTION B | | | 1 | IMM4 | | | Rc | | | Rb | | | Ra | | | 2 |
| 2 | INSTRUCTION C | | | 0 | 0 | IMM6 | | | | | Rb | | | Ra | | | 2 |
| 3 | INSTRUCTION D | | | 0 | 1 | IMM6 | | | | | Rb | | | Ra | | | 2 |
| 4 | INSTRUCTION E | | | 1 | 0 | IMM6 | | | | | Rb | | | Ra | | | 2 |
| 5 | INSTRUCTION G | | | 0 | 0 | 0 | 0 | 0 | Rc | | | Rb | | | Ra | | | 4 |
| 6 | INSTRUCTION H | | | 0 | 0 | 0 | 0 | 1 | Rc | | | Rb | | | Ra | | | 4 |
| 7 | INSTRUCTION P | | | 0 | 0 | 0 | 1 | 0 | Rc | | | Rb | | | Ra | | | 4 |
| 8 | INSTRUCTION Q | | | 0 | 0 | 0 | 1 | 1 | Rc | | | Rb | | | Ra | | | 4 |
| 9 | INSTRUCTION T | | | 0 | 0 | 1 | 0 | 0 | Rc | | | Rb | | | Ra | | | 4 |
| 10 | INSTRUCTION F | | | | | | | 0 | IMM4 | | | | | | Ra | | | 5 |
| 11 | INSTRUCTION U | | | | | | | | | 0 | 0 | Rb | | | Ra | | | 8 |
| 12 | INSTRUCTION V | | | | | | | | | 0 | 1 | Rb | | | Ra | | | 8 |
| 13 | INSTRUCTION W | | | | | | | | | 1 | 0 | Rb | | | Ra | | | 8 |

INSTRUCTIONS HAVE BEEN SORTED IN ASCENDING ORDER IN TERMS OF opcode_sub_grp_length[]

FIG. 18

| n | | 15 MSB | 14 | 13 | 12 | 11 | 10 | 9 | 8 | 7 | 6 | 5 | 4 | 3 | 2 | 1 | 0 LSB | opcode_sub_grp_value[n] |
|---|---|---|---|---|---|---|---|---|---|---|---|---|---|---|---|---|---|---|
| INSTRUCTION A | 0 | 0 | 0 | IMM4 | | | 0 | Rc | | Rb | | | Ra | | | | 0b00 |
| INSTRUCTION B | 1 | 0 | 0 | IMM4 | | | 1 | Rc | | Rb | | | Ra | | | | 0b00 |
| INSTRUCTION C | 2 | 0 | 1 | 0 | IMM6 | | | | | Rb | | | Ra | | | | 0b01 |
| INSTRUCTION D | 3 | 0 | 1 | 0 | IMM6 | | | | | Rb | | | Ra | | | | 0b01 |
| INSTRUCTION E | 4 | 0 | 1 | 1 | IMM6 | | | | | Rb | | | Ra | | | | 0b01 |
| INSTRUCTION G | 5 | 1 | 0 | 0 | 0 | 0 | 0 | Rc | | Rb | | | Ra | | | | 0b1000 |
| INSTRUCTION H | 6 | 1 | 0 | 0 | 0 | 0 | 1 | Rc | | Ra | | | Ra | | | | 0b1000 |
| INSTRUCTION P | 7 | 1 | 0 | 0 | 0 | 1 | 0 | Rc | | Ra | | | Ra | | | | 0b1000 |
| INSTRUCTION Q | 8 | 1 | 0 | 0 | 0 | 1 | 1 | Rc | | Rb | | | Ra | | | | 0b1000 |
| INSTRUCTION T | 9 | 1 | 0 | 0 | 1 | 0 | 0 | IMM4 | | | | | Ra | | | | 0b1000 |
| INSTRUCTION F | 10 | 1 | 0 | 0 | 1 | 0 | 1 | 0 | 0 | Rb | | | Ra | | | | 0b10010 |
| INSTRUCTION U | 11 | 1 | 0 | 0 | 1 | 1 | 1 | 0 | 0 | 0 | Rb | | Ra | | | | 0b10011000 |
| INSTRUCTION V | 12 | 1 | 0 | 0 | 1 | 1 | 1 | 0 | 0 | 1 | Rc | | Ra | | | | 0b10011000 |
| INSTRUCTION W | 13 | 1 | 0 | 0 | 1 | 1 | 1 | 0 | 1 | 0 | Rb | | Ra | | | | 0b10011000 |

BIT PATTERN (SHADED PORTION) CONSISTING OF 0 AND 1 OF EACH ROW REPRESENTS opcode_sub_grp_value[n] OF GROUP SUB-FIELD OF EACH INSTRUCTION

INSTRUCTION OPERATION CODE GENERATION SYSTEM

This application is the National Phase of PCT/JP2007/072413, filed Nov. 19, 2007, which is based upon and claims the benefit of priority from prior Japanese Patent Application No. 2006-314260 (filed Nov. 21, 2006), the entire contents of which are incorporated herein by reference.

TECHNICAL FIELD

The present invention relates to an instruction operation code generation system used in a processor design tool and, more particularly, to a technique for automatically deciding an instruction operation code in designing an instruction set of a processor.

BACKGROUND ART

Various tools have been developed for efficient design of a processor. As one of such tools, there is known a tool that generates a processor hardware configuration or processor software development tool according to design specification of a processor. Such a tool is hereinafter referred to as "processor design tool". In conventional processor design tools, all information including instruction word length, operation code, and operand is defined by a designer. When defining one instruction, the designer defines the word length of the instruction and both type and number of operands used in the instruction.

Conventional processor design tools are disclosed in Non-Patent Citations 1 and 2 and Patent Citations 1 to 3. For example, a tool of Non-patent Citation 1 defines an instruction set of a processor to thereby generate a simulator of the processor. In the tool of Non-patent Citation 1, an instruction bit pattern is defined as follows.

CODING {Dest Src1 Src2 0b010000 0 b10000}

The portion between "{" and "}" represents a bit pattern. Dest, Src1, and Src2 each represent the register number. 0b010000 and 0b10000 following after Dest, Src1, and Src2 are each a binary digit representing an operation code of the instruction. In this manner, all information constituting the bit pattern of the instruction needs to be defined by the designer. The similar story goes for tools disclosed in Non-Patent Citation 2 and Patent Citations 1 and 2.

The instruction operation code is an instruction field for distinguishing one instruction from other instructions. In the case where the instruction set has been settled in advance, it is only necessary for designers to define the instruction operation code once in the beginning. However, when investigating what kind of an instruction is to be added to the instruction set, the designer needs to correct the instruction operation code several times.

If there is no need to define or correct the instruction operation code, the number of items to be defined by the designer is reduced. What value the operation code has is not important, but it is only necessary that the operation code be defined so as to make respective instructions distinguishable from each other. When a mechanism in which the instruction operation code can automatically be defined is achieved, the number of items to be defined by the designer can be reduced, leading to improvement in design efficiency.

Non-Patent Citation 1: S. Pees et al., "LISA-Machine Description Language for Cycle-Accurate Models of Programmable DSP Architectures", 36th Design Automation Conference (DAC 99), June 1999, pp. 933-938

Non-Patent Citation 2: Andreas Hoffmann, et al., "A Survey on Modeling Issues Using the Machine Description Language Lisa," Proceedings of ICASSP 2001, VOL. 2, pp. 1137-1140, May 7-11, 2001

Patent Citation 1: U.S. Pat. No. 6,477,683
Patent Citation 2: U.S. Pat. No. 6,862,563
Patent Citation 3: Jpn. PCT National Publication No. 2003-518280
Patent Citation 4: JP-A-2003-323463

DISCLOSURE OF THE INVENTION

Technical Problem

The abovementioned conventional instruction set generation tools have a problem that efficiency is deteriorated because it is necessary for designers to define the instruction operation code. When the designer must take a lot of trials and errors while investigating the content of the instruction set, the less number of items to be input by the designer can achieve more time-effective design.

An object of the present invention is to provide an instruction operation code automatic generation method capable of achieving automatic generation of the operation code so as to increase the processor instruction set design job efficiency and reduce workload on designers in investigation of an instruction set.

Technical Solution

To solve the above object, according to a first aspect of the present invention, there is provided an instruction operation code generation system including: an operation code bit width decision means for deciding, according to specification data associated with a processor instruction set, a bit width to be assigned for an operation code of each instruction of the instruction set; an instruction classification means for classifying the instructions according to the operation code bit width; and an operation code value decision means for deciding the value of the operation code of each instruction according to the classification of the instructions.

Further, according to a second aspect of the present invention, there is provided a system for generating a hardware configuration definition of a processor or software development tool of a processor based on specification data associated with an instruction of the processor, wherein the system uses the instruction operation code generation system as described above to decide the value of the operation code of each instruction that constitutes the instruction set.

Further, according to a third aspect of the present invention, there is provided an instruction operation code generation method including: a specification data analysis step of interpreting specification data associated with an instruction set of a processor; a step of deciding a bit width to be assigned for an operation code of each instruction of the instruction set; a step of classifying the instructions according to the operation code bit width; and a step of deciding the value of the operation code of each instruction according to the classification of the instruction, the above respective means operating according to the specification data associated with the processor instruction set.

Advantageous Effects

According to the present invention, the value of the operation code of each instruction is automatically generated according to the specification data associated with the processor instruction set, thereby eliminating the need for designers to define the operation code, which correspondingly increases the processor instruction set design job efficiency and reduces workload on designers in investigation of an instruction set.

BRIEF DESCRIPTION OF THE DRAWINGS

FIG. 6 is a view showing an example of instructions serving as specification data;

FIG. 7 is a view showing an example of assignment of the operation code according to the first operation code decision method;

FIG. 9 is a view showing an example of assignment of the operation code according to the second operation code decision method;

FIG. 11 is a view showing an example of assignment of the operation code according to the third operation code decision method;

FIG. 15 is a view showing an example of instructions serving as specification data;

FIG. 16 is a view showing an example of assignment of index sub-field according to the fourth operation code decision method;

FIG. 17 is a view showing an example of instructions after sorting made based on the bit width of the group sub-field according to the fourth operation code decision method; and FIG. 18 is an example of assignment of group sub-field according to the fourth operation code decision method.

EXPLANATION OF REFERENCE

Figure 1:
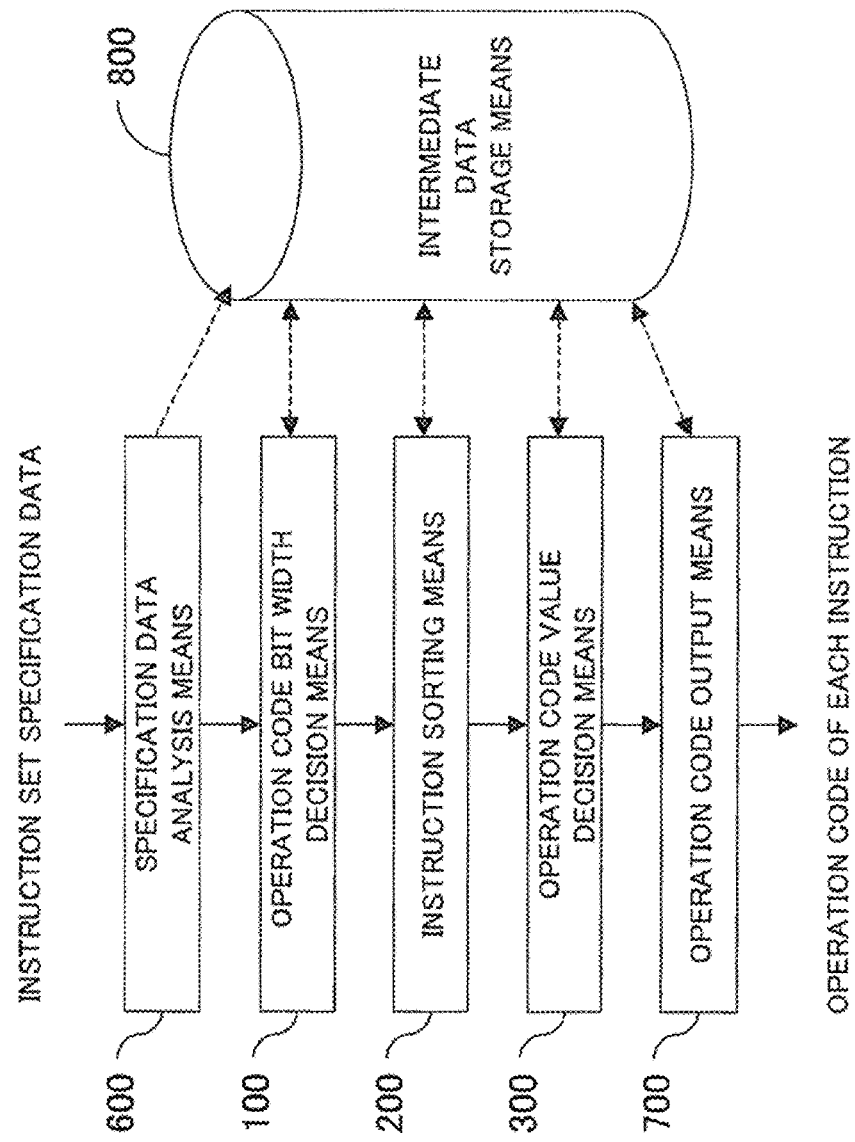
FIG. 1 is a view showing an instruction operation code generation system according to a first exemplary embodiment of the present invention.

100: Operation code bit width decision means
200: Instruction sorting means
300: Operation code value decision means
400: First operation code sub-field value decision means
500: Second operation code sub-field value decision means
600: Specification data analysis means
700: Operation code output means
800: Intermediate data storage means

BEST MODE FOR CARRYING OUT THE INVENTION

Preferred exemplary embodiments for practicing an instruction operation code generation system according to the present invention will be described in detail below with reference to the accompanying drawings.

(First Exemplary Embodiment)

FIG. 1 shows a configuration of an instruction operation code generation system according to a first exemplary embodiment of the present invention. The instruction operation code generation system shown in FIG. 1 includes the following means operating based on specification data associated with an instruction set of a processor: a specification data analysis means 600 that interprets specification data associated with the processor instruction set; an operation code bit width decision means 100 that decides a bit width that can be allocated to an operation code of each instruction; an instruction sorting means 200 that sorts the instructions according to the operation code bit width; an operation code value decision means 300 that decides the value of the operation code of each instruction; an operation code output means 700 that outputs the instruction operation code; and an intermediate data storage means 800 that stores data used by the specification data analysis means 600, operation code bit width decision means 100, instruction sorting means 200, operation code value decision means 300, and operation code output means 700.

With the above configuration, the value of the operation code of each instruction is automatically generated according to the specification data associated with the processor instruction set, thereby eliminating the need for designers to define the operation code, which correspondingly increases the processor instruction set design job efficiency and reduces workload on designers in investigation of an instruction set.

(Second Exemplary Embodiment)

Figure 2:
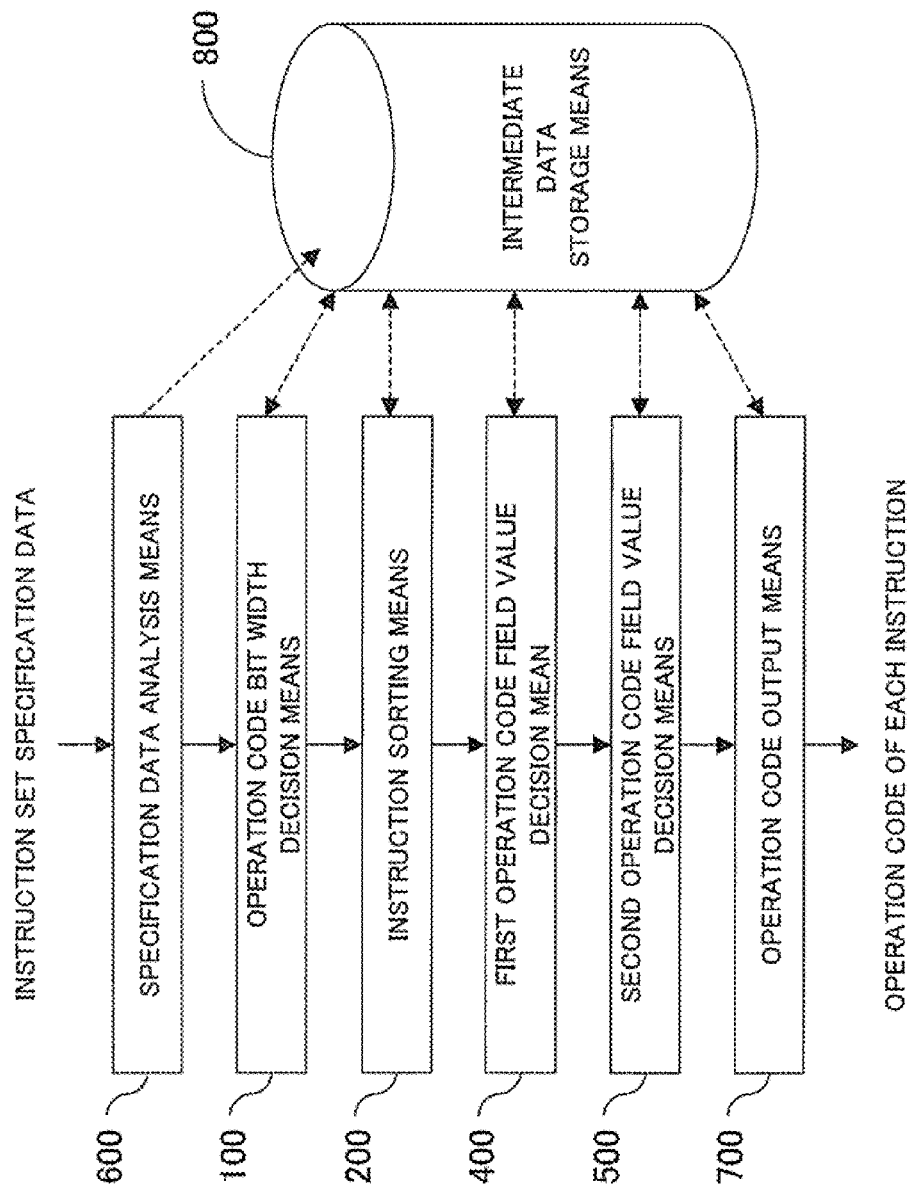
FIG. 2 is a view showing an instruction operation code generation system according to a second exemplary embodiment of the present invention.

FIG. 2 shows a configuration of an instruction operation code generation system according to a second exemplary embodiment of the present invention. The instruction operation code generation system shown in FIG. 2 includes a specification data analysis means 600 that interprets specification data associated with the processor instruction set, an operation code bit width decision means 100 that decides a bit width that can be allocated to an operation code of each instruction, an instruction sorting means 200 that sorts the instructions according to the operation code bit width, first and second operation code sub-field value decision means 400 and 500 that decide the values of two sub-fields constituting one operation code respectively according to the operation code bit width, an operation code output means 700 that outputs the instruction operation code, and an intermediate data storage means 800 that stores data used by the specification data analysis means 600, operation code bit width decision means 100, instruction sorting means 200, operation code value decision means 300, first and second operation code sub-field value decision means 400 and 500, and operation code output means 700.

With the above configuration, as in the case of the first exemplary embodiment, the value of the operation code of each instruction is automatically generated according to the specification data associated with the processor instruction set, thereby eliminating the need for designers to define the operation code, which correspondingly increases the processor instruction set design job efficiency and reduces workload on designers in investigation of an instruction set. Further, as compared with the instruction operation code generation system according to the first exemplary embodiment, it is easier to decode the generated operation code for the instruction operation code generation system according to the second exemplary embodiment.

The instruction operation code generation systems according to the first and second exemplary embodiments may be realized by a program operating on a computer. In this case, the program constituting the instruction operation code generation system allows the computer to function as the above respective means 100 to 800. In this configuration, the instruction operation code generation system controls the computer to read out specification data associated with the processor instruction set and decides the operation code of each instruction based on the specification data.

With reference to FIGS. 3 to 18, examples of the instruction operation code generation systems according to the first and second exemplary embodiments will concretely be described. In the following examples, the above respective means 100 to 800 shown in FIGS. 1 and 2 are realized by a processor (CPU: central processing unit) of a computer executing a program code for instruction operation code generation system stored in a storage medium of the computer.

EXAMPLES

First, how a processor instruction is defined will be described.

The processor instruction is represented by a bit pattern consisting of 0 and 1. Which bit in the pattern has what meaning is defined in advance, and the processor reads out the bit pattern of the instruction to interpret the instruction.

The bit pattern of the instruction includes two fields: an operation code field and operand field. The operation code field is a field representing the name or type of the instruction. The instruction necessarily includes one operation code in order to represent the name or type of the instruction. Since the operation code represents the name or type of the instruction by itself, the operation code differs depending on the name or type of the instruction. The operand is a field representing a parameter given to the instruction. Some instruction may have a plurality of operands and some instructions may not have any operands.

When interpreting the instruction, the processor first acquires the name or type of the instruction from the instruction operation code and then acquires the number of operands or meaning thereof from the name or type of the instruction. Since there is one-to-one correspondence between the name or type of the instruction and number of the operands or meaning thereof, whether the operation code is easily interpreted or not directly influences the easiness of interpretation of the instruction.

For example, if the instruction word length, the starting bit position of the operation code, and operation code bit width were all constant, the operation code could be interpreted very easily. However, the operation code bit width is not constant in general, and there may be a case where the instruction word length or starting bit position of the operation code is not constant. Thus, in order to make interpretation of the operation code easier, it is necessary to make the starting bit position of the operation code constant and reduce the variation of the number of bit widths as much as possible.

[Operation Code Generation Method]

Next, how the instruction operation code is decided will be described. The meanings of various operators (=, +=, ==, <<, &, ~, +, -, etc.) used in this specification are assumed to be the same as those defined in C language. For example, "x=y" means an assignment operation in which y is assigned to x. "x+=y" means an assignment operation in which x+y is assigned to x (that is, "x+=y" has the same meaning of "x=x+y"). "x==y" means a relational operation for determining the equality between x and y. In this operation, when x and y are equal to each other, true is returned, while when x and y are not equal, false is returned. "x<<y" means a shift operation in which x is shifted to the left by the value of y. "x&y" means a logical operation for calculating logical AND between x and y. "~x" means an operation in which all bits of x are inverted.

To begin with, the terms used in the following description are defined. Hereinafter, the term <specification> means information, i.e. specification data, that the designer should define in order to generate the operation code.

[Definition 1]
Instruction number is represented by k or i.

[Definition 2]
Total number of instructions is represented by S <specification>.

[Definition 3]
Instruction word length is represented by N <specification>.

[Definition 4]
Width of bit pattern used for representing all operands of instruction k is represented by total_operands_length[k] <specification>.

[Definition 5]
Length of operation code field of instruction k is represented by opcode_length[k]bit.

[Definition 6]
Value of operation code field of instruction k is represented by opcode_value[k]. opcode_value[k] is unsigned integer.

[Definition 7]
Number of instructions in which length of operation code field is x-bit is represented by num_of_inst_having_opcode_length(x).

[Definition 8]
Minimum value of power of two that is not less than value x is represented by min_power_of_2(x).

[Definition 9]
Value obtained from the bit reverse of value x having bit width of "length" is represented by bitrev(x,length).

Figure 3:
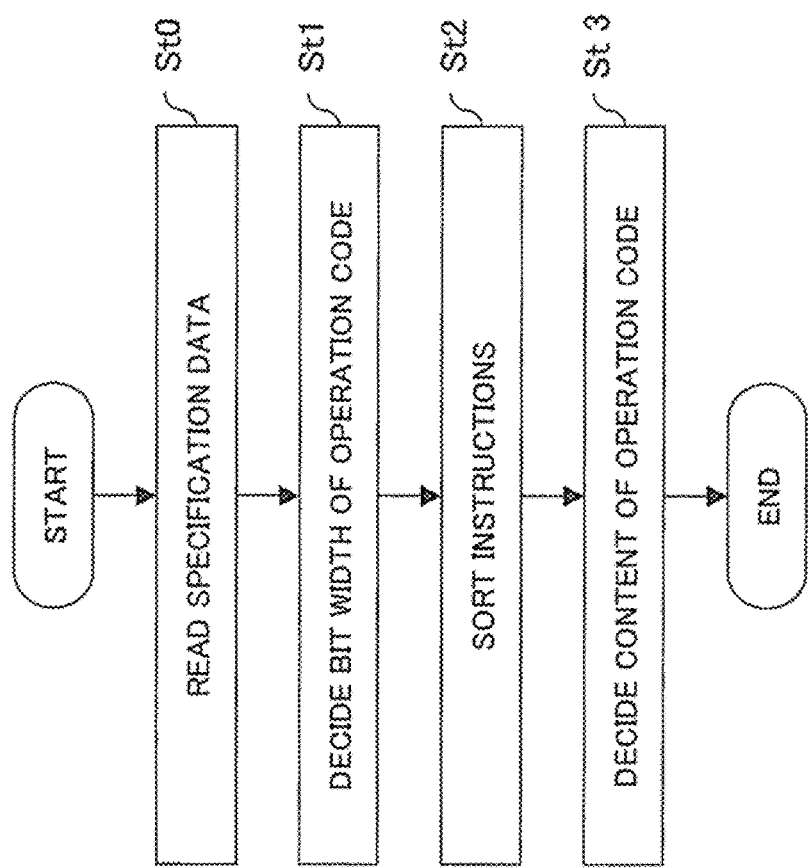
FIG. 3 is a flowchart showing an operation code assigning method as an example of the present invention.
Figure 4:
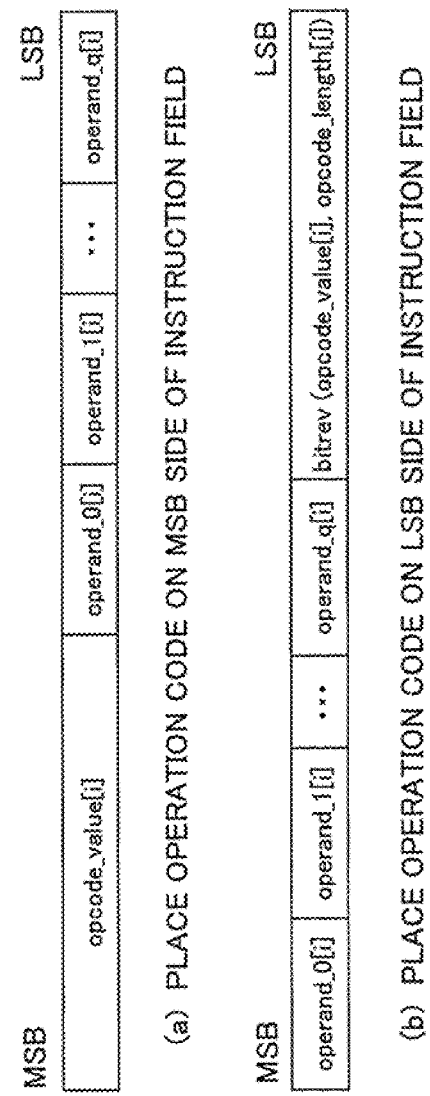
FIG. 4(a) is a view showing a method of arranging the operation code on MSB side of the bit pattern of an instruction.
FIG. 4(b) is a view showing a method of arranging the operation code on LSB side of the bit pattern of an instruction.

Next, a method of assigning the instruction operation code based on the above definitions 1 to 9 will be described below. FIG. 3 is a flowchart corresponding to this method.

(0) The specification data is read (step St0).

In this step, the bit pattern width total_operands_length[k] used to represent all operands of instruction k is read out from the specification data. This processing is executed by the specification data analysis means 600 shown in FIGS. 1 and 2.

(1) The bit width of the operation code field of the instruction is decided (step St1).

In this step, the bit width opcode_length[k] of the operation code field of the instruction k is defined as follows.

opcode_length[*k*]=*N*−total_operands_length[*k*] (k=0, 1, . . . , S−1)

This processing is executed by the operation code bit width decision means 100 shown in FIGS. 1 and 2.

(2) Subsequently, instructions are sorted (step St2).

In this step, all instructions are sorted based on total_operands_length[k]. The instruction number after the sorting is represented by i. The number i of the instruction that uses the largest number of bits for the operand is set to 0. Further, the number i of the instruction that uses the smallest number of bits for the operand is set to S−1.

This processing is executed by the instruction sorting means 200 shown in FIGS. 1 and 2.

Then, the value of the operation code field of the instruction is decided (step St3).

In this step, the value "opcode_value[i]" of the operation code field is decided in the order starting from 0-th instruction. This processing is executed by the operation code decision means 300 shown in FIG. 1 or first and second operation code sub-field value decision means 400 and 500 shown in FIG. 2.

In the case where the operation code field is arranged on Most Significant Bit (MSB) side of the bit pattern of an instruction in the above procedure, the operation code field is arranged as shown in FIG. 4(a). On the other hand, in the case where the operation code field is arranged on Least Significant Bit (LSB) side of the bit pattern of an instruction, the value obtained from the bit reverse of the value of the operation code field is arranged as shown in FIG. 4(b).

In FIGS. 4(a) and 4(b), opcode_length[i] represents the bit width of the operation code of the instruction [i], opcode_value[i] represents the value of the operation code of the instruction [i], operand_0[i] represents the content of 0th operand of the instruction [i], operand_1[i] represents the content of 1st operand of the instruction [i], operand_q[i] represents the content of q-th operand of the instruction [i], and bitrev(X,Y) represents the value obtained from the bit-reversed value of lower Y bits of X.

Some approaches are available as the method (step St3) for deciding the value of the operation code field. Hereinafter, the operation code decision methods will be described.

[First Operation Code Decision Method]

A first operation code decision method will be described.

In this operation code decision method, (1) decision of bit width of operation code field and (2) sorting of instructions are performed according to the abovementioned procedure. After that, (3) value opcode_value[i] of operation code of each instruction is decided as follows.

Figure 5:
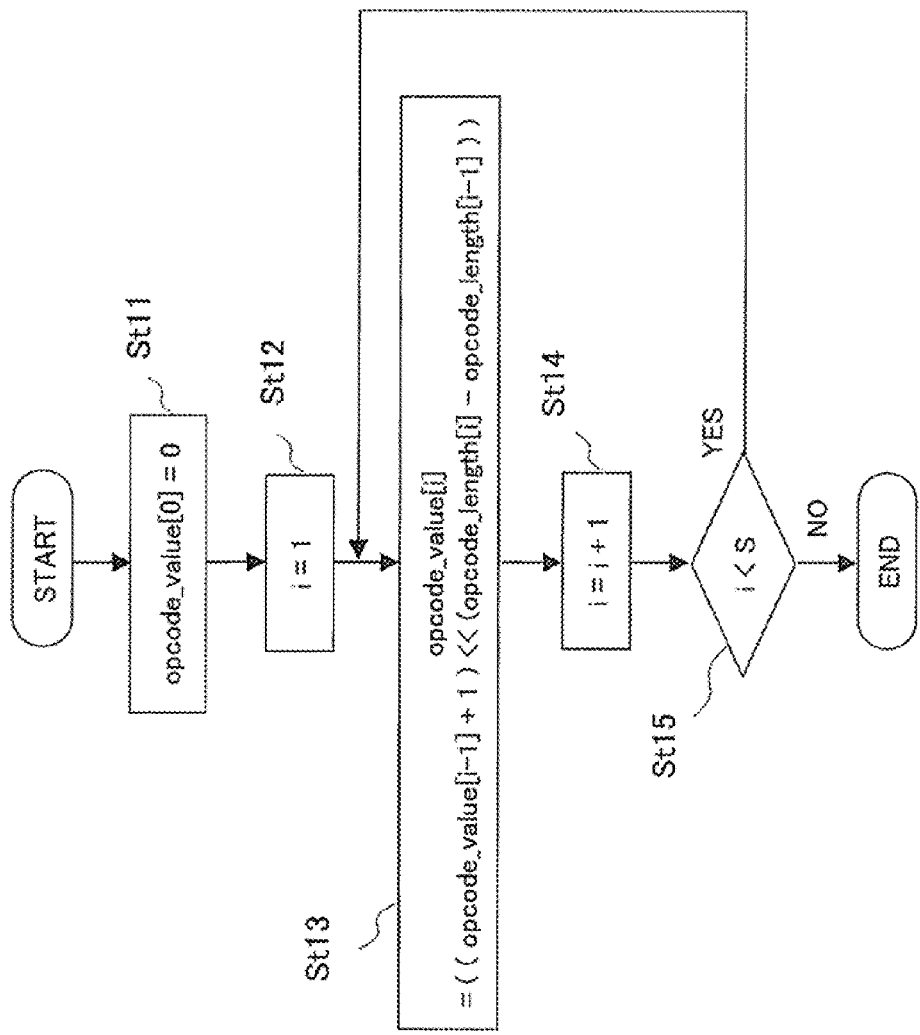
FIG. 5 is a flowchart showing a first operation code decision method.

FIG. 5 shows a flowchart of the first operation code decision method. In FIG. 5, i represents the instruction number, S represents the total number of instructions, opcode_value[i] represents the value of the operation code of the instruction i, and opcode_length[i] represents the bit width of the operation code of the instruction i.

0 is assigned to opcode_value[0] (step St11).

Then, opcode_value[i] is sequentially decided as follows with the instruction number i ranging from 1 to S−1 (step St12 to St15).

$$\text{opcode\_value}[i] = ((\text{opcode\_value}[i-1]+1) << (\text{opcode\_length}[i]-\text{opcode\_length}[i-1])$$

That is, the sum of opcode_value[i−1] and 1 is shifted to the left by the value of the difference between opcode_length[i] and opcode_length[i−1], and the value obtained from the shift operation is assigned to opcode_value[i]. In this manner, the value of the operation code of each instruction is decided.

Examples of assignment of the operation code according to the first operation code decision method are shown in FIGS. 6 and 7. FIG. 6 represents bit patterns of 14 instructions (S=14). In FIG. 6, Ra, Rb, and Rc are operand fields each represent a register number. IMM6, IMM4, and IMM2 are operand fields each representing a numerical value. In FIG. 6, the word length of each instruction is 16-bit (N=16). Further, in FIG. 6, bit pattern consisting of 0 and 1 written on the MSB side of each bit pattern represents the operation code.

The values of the operation codes of instructions U, V, W, A, B, C, D, E, F, G, H, P, Q, and T are decided with the assumption that the specification data of an instruction set in which the word length of each instruction and bit width of each operand field are set as shown in FIG. 6 is given.

The instructions shown in FIG. 6 are sorted based on opcode_length[i], and the processing from St11 to St15 of FIG. 5 is executed, whereby FIG. 7 is obtained. As shown in FIG. 7, the value "opcode_value[i] (i=0, ..., 13)" of each instruction does not overlap the value of operation code of any other instruction. Thus, it is possible to correctly identify each instruction with the operation code generated according to the first operation code decision method.

Note that FIG. 6 is merely one representation model, and it is not always necessary to describe the specification data as shown in FIG. 6. The specification data may be described as a text file.

As can be seen from the above, the first operation code decision method is very simple. Further, the first operation code decision method has an advantage that it can represent a large number of operation codes, as compared to the following operation code decision methods.

Decoding of the operation code generated in the first operation code decision method is slightly complicated. That is, a subtraction and a comparison operation are required to decode the operation code generated in the first operation code decision method. It is necessary to execute a plurality of subtractions and comparison operations simultaneously in order to decode the instruction in one cycle, so that the footprint of a decode circuit for decoding the operation code is inevitably increased as compared to the case of using the following operation code decision methods.

[Second Operation Code Decision Method]

Next, a second operation code decision method will be described.

In this operation code decision method, (1) decision of bit width of operation code field (step St1) and (2) sorting of instructions are performed (step St2) according to the abovementioned procedure. After that, (3) value "opcode_value[i]" of operation code of each instruction is decided as follows.

Figure 8:
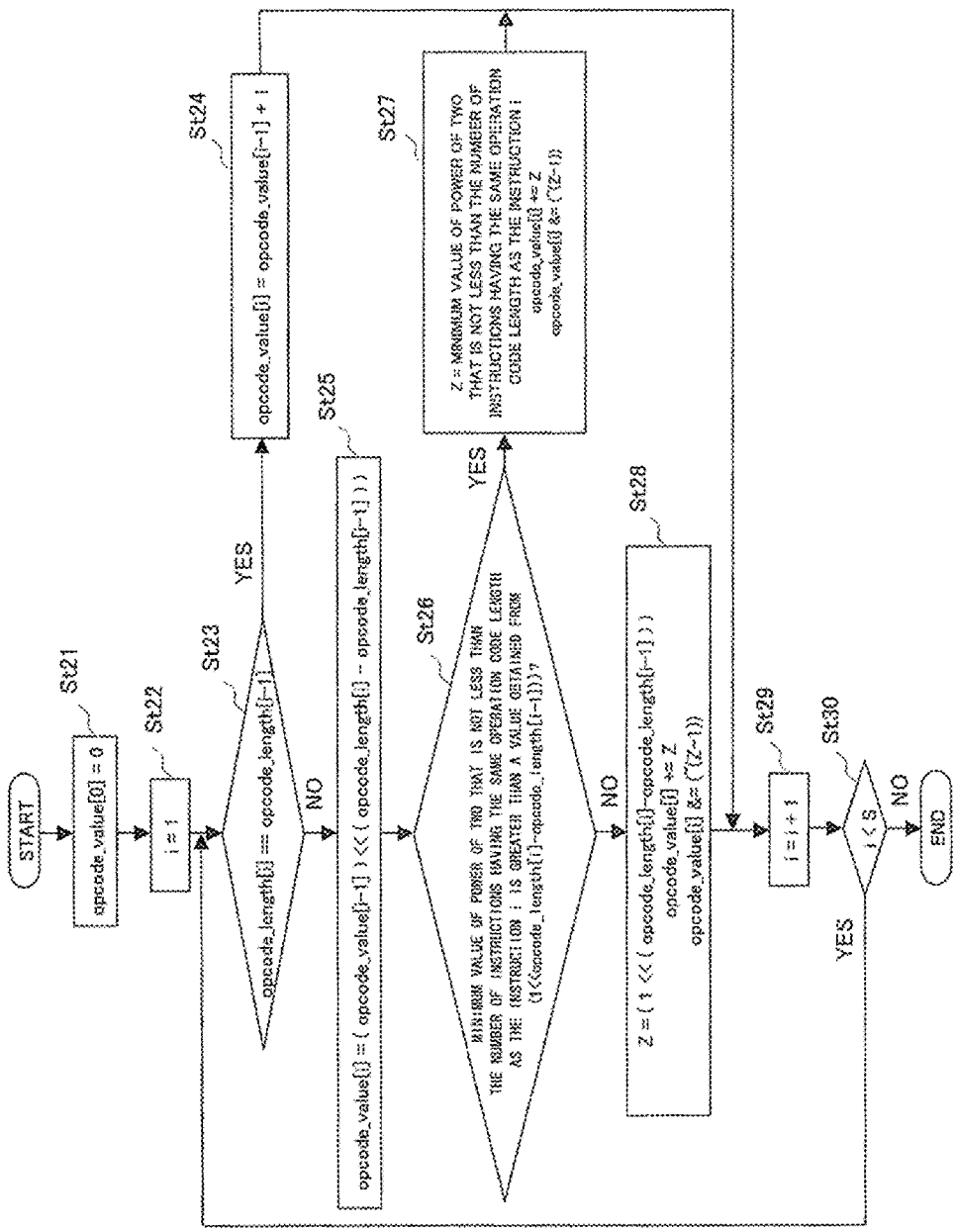
FIG. 8 is a flowchart showing a second operation code decision method.

FIG. 8 shows a flowchart of the second operation code decision method. In FIG. 8, i represents the instruction number, S represents the total number of instructions, opcode_value[i] represents the value of the operation code of the instruction i, and opcode_length[i] represents the bit width of the operation code of the instruction i.

0 is assigned to opcode_value[0] (step St21).

Then, opcode_value[i] is sequentially decided as follows with the instruction number i ranging from 1 to S−1 (step St22 to St30).

In step St23, it is determined whether opcode_length[i] is equal to opcode_length[i−1].

When opcode_length[i] is equal to opcode_length[i−1] (Yes in step St23), 1 is added to opcode_value[i−1], and the value obtained from the addition is assigned to opcode_value [i] (step St24). That is, opcode_length[i] is obtained by adding 1 to opcode_value[i−1].

On the other hand, when opcode_length[i] is not equal to opcode_length[i−1] (No in step St23), the opcode_value [i] is set to (opcode_value[i−1]<<(opcode_length[i]−opcode_length[i−1])) (step St25). That is, opcode_length[i−1] is subtracted from opcode_length[i]. Then, opcode_value[i−1] is shifted to the left by the value obtained from the subtraction, and the value obtained from the shift operation is assigned to opcode_value[i]. Subsequently, step St26 is executed.

In step St26, it is determined whether a value (min_power_of_2(num_of_inst_having_opcode_length(opcode_length[i]))) which is minimum value of power of two that is not less than the number of instructions having the same operation code length as the instruction i is greater than a value obtained from (1<<opcode_length[i]−opcode_length [i−1])), and larger one is set to Z.

When the determination in step St26 is YES, Z is set to min_power_of_2(num_of_inst_having_opcode_length(opcode_length[i])), and opcode_value[i] is calculated according to a calculation formula: opcode_value[i]=(opcode_value [i]+Z)&(~(Z−1)).

On the other hand, when the determination in step St26 is NO, Z is set to (1<<(opcode_length[i]−opcode_length[i−1])), and opcode_value[i] is calculated according to a calculation formula: opcode_value[i]=(opcode_value[i]+Z)& (~(Z−1)) (step St28).

In this manner, the value of the operation code of each instruction is decided.

Examples of assignment of the operation code according to the second operation code decision method are shown in FIGS. 6 and 9. The instructions shown in FIG. 6 as the specification code are sorted based on opcode_length[i], and the processing from St21 to St30 of FIG. 8 is executed, whereby FIG. 9 is obtained.

As shown in FIG. 9, the value "opcode_value[i] (i=0, . . . , 13)" of each instruction does not overlap the value of operation code of any other instruction. Thus, it is possible to correctly identify each instruction with the operation code generated according to the second operation code decision method.

As can be seen from the above, the second operation code decision method is slightly more complicated than the first operation code decision method. However, decoding of the operation code generated in the second operation code decision method is easier than in the case of the first operation code decision method. This is because that the operation code generated by the second operation code decision method is constituted by a bit string representing a group of operation codes having the same bit width and bit string representing the index of an instruction in the group. Thus, the operation code can be divided into two bit strings, allowing the operation code to be decoded hierarchically.

That is, when the operation code generated in the second operation code decision method is decoded, the bit string representing a group of operation codes having the same bit width is first decoded. Then, a group having the longest bit string is selected, and bit string representing the index of an instruction in the group is decoded. It is not necessary to execute a subtraction in order to decode the operation code generated in the second operation code decision method. Thus, a decode circuit can be constructed only with a logical operation and shift operation. As a result, the decode circuit in the second operation code decision method is simpler than that in the first operation code decision method.

[Third Operation Code Decision Method]

A third operation code decision method will be described.

In this operation code derision method, (1) decision of bit width of operation code field (step St1) and (2) sorting of instructions are performed (step St2) according to the above-mentioned procedure. After that, (3) value "opcode_value[i]" of operation code of each instruction is decided as follows.

Figure 10:
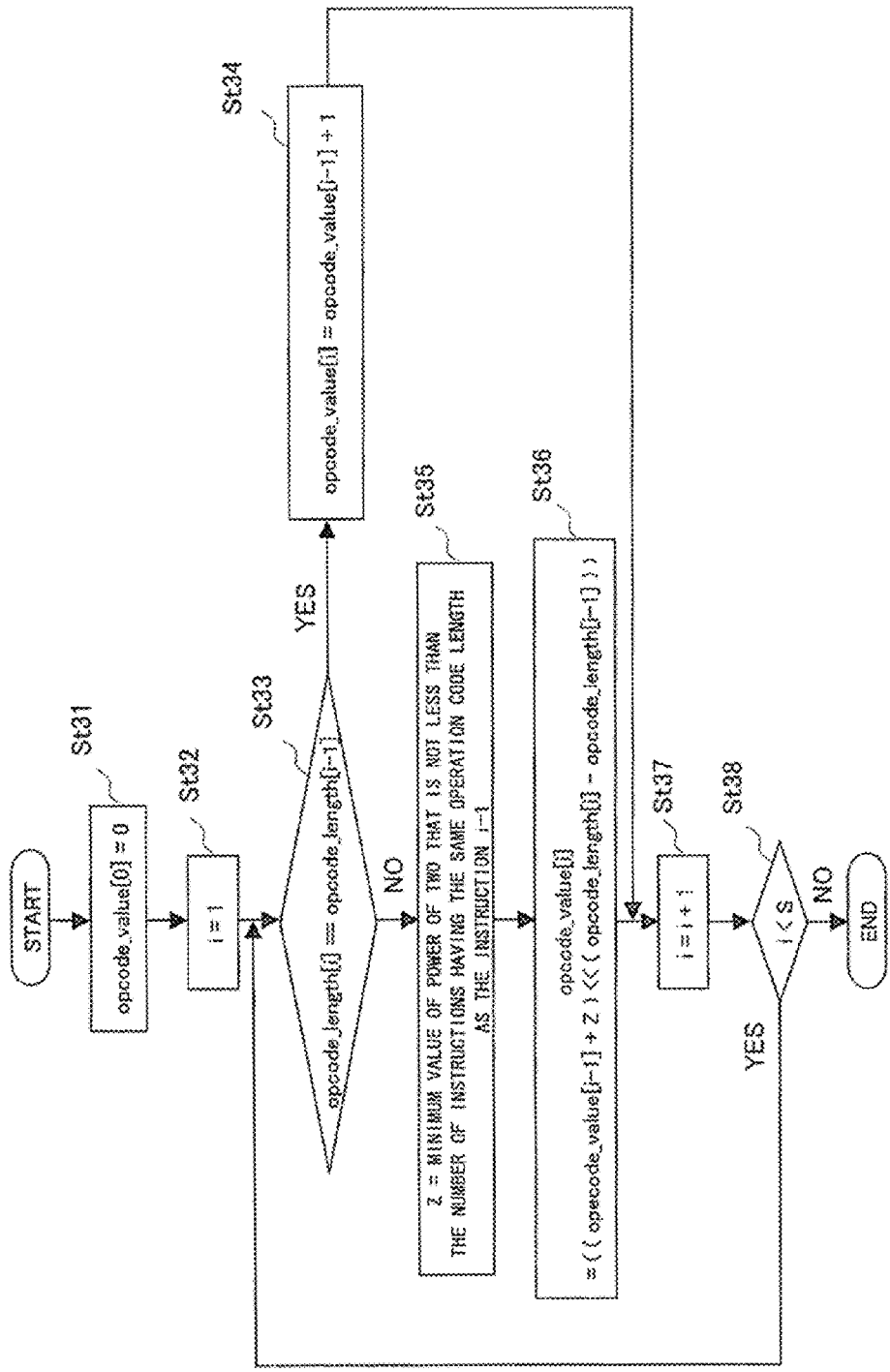
FIG. 10 is a flowchart of a third operation code decision method.

FIG. 10 shows a flowchart of the third operation code decision method. In FIG. 10, i represents the instruction number, S represents the total number of instructions, opcode_value[i] represents the value of the operation code of the instruction i, and opcode_length[i] represents the bit width of the operation code of the instruction i.

0 is assigned to opcode_value[0] (step St31).

Then, opcode_value[i] is sequentially decided as follows with the instruction number i ranging from 1 to S−1 (step St32 to St38).

In step St33, it is determined whether opcode_length[i] is equal to opcode_length[i−1].

When opcode_length[i] is equal to opcode_length[i−1] (Yes in step St33), 1 is added to opcode_value[i−1], and the value obtained from the addition is assigned to opcode_value[i] (step St34).

On the other hand, when opcode_length[i] is not equal to opcode_length[i−1] (No in step St33), a value (min_power_of_2(num_of_inst_having_opcode_length(opcode_length[i−1]))) which is minimum value of power of two that is not less than the number of instructions having the same operation code length as the instruction i is set to Z (step St35). Subsequently, step St36 is executed.

In step St36, opcode_value[i] is calculated according to a calculation formula:

$$\text{opcode\_value}[i]=((\text{opcode\_value}[i-1]+Z)<<(\text{opcode\_length}[i]-\text{opcode\_length}[i-1]).$$

In this manner, the value of the operation code of each instruction is decided.

Examples of assignment of the operation code according to the third operation code decision method are shown in FIGS. 6 and 11. The instructions shown in FIG. 6 as the specification code are sorted based on opcode_length[i], and the processing from St31 to St38 of FIG. 8 is executed, whereby FIG. 11 is obtained.

As shown in FIG. 11, the value "opcode_value[i] (i=0, . . . , 13)" of each instruction does not overlap the value of operation code of any other instruction. Thus, it is possible to correctly identify each instruction with the operation code generated according to this operation code decision method.

In the third operation code decision method, a subtraction and a comparison operation are required to decode the operation code generated. This is the same as the first operation code decision method.

The third operation code decision method is not as simple in the procedure as the first operation code decision method and is not as easy in the decoding of operation code as the second operation code decision method as compared to the first and second operation code decision methods.

[Fourth Operation Code Decision Method]

A fourth operation code decision method will be described.

In this operation code decision method, the operation code field is divided into two sub-fields. One is a group sub-field, and the other is an index sub-field. The group sub-field is placed on the MSB side and index sub-field is placed on the LSB side. In this method, the operation codes of the index sub-field and those of the group sub-field are decided separately.

Figure 12:
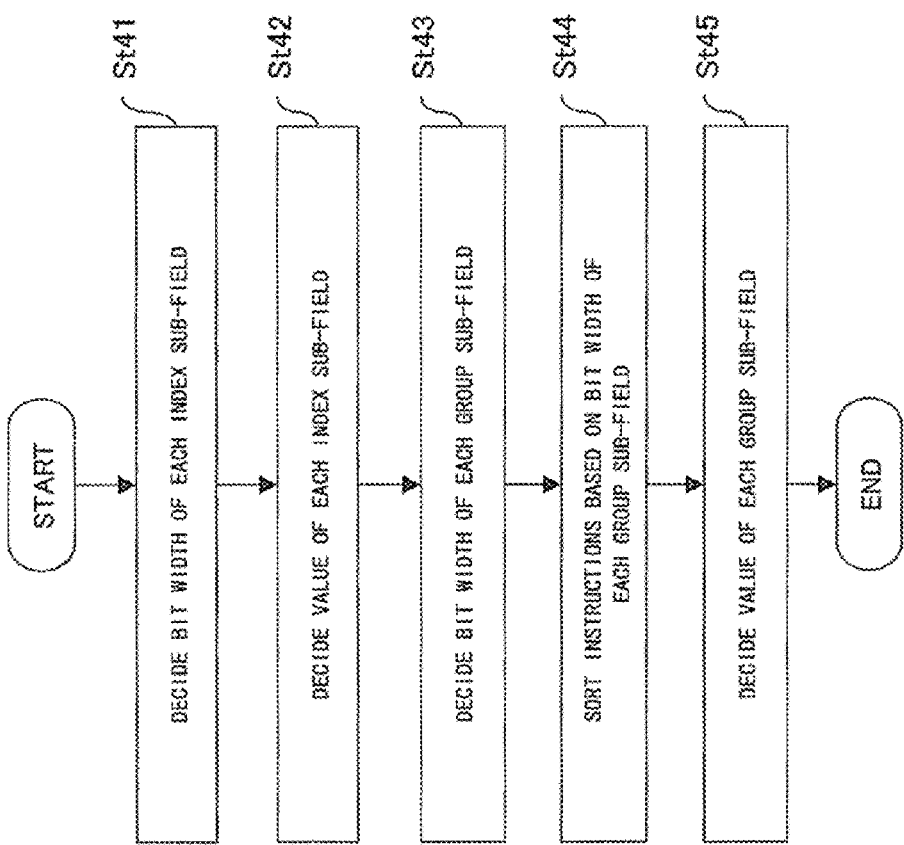
FIG. 12 is a flowchart of a fourth operation code decision method.

FIG. 12 shows a flowchart of the fourth operation code decision method. As shown in FIG. 12, the fourth operation code decision method includes the following steps: a step of deciding the bit width of each index sub-field (step St41), a step of deciding the value of each index sub-field (step St42), a step of deciding the bit width of each group sub-field (step St43), a step of sorting instructions based on the bit width of each group sub-field (step St44), and a step of deciding the value of each group sub-field (step st45).

The symbols concerning the two sub-fields are defined as follows.

[Definition 10]

Length of group sub-field of instruction i is represented by opcode_sub_grp_length[i].

[Definition 11]

Value of group sub-field of instruction i is represented by opcode_sub_grp_value[i].

[Definition 12]

Length of index sub-field of instruction i is represented by opcode_sub_idx_length[i].

[Definition 13]

Value of index sub-field of instruction i is represented by opcode_sub_idx_value[i].

[Definition 14]
Length of index sub-field is defined for all the instructions as follows (step St41).

opcode_sub_idx_length[*i*]=min_power_of_2(num_o-f_inst_having_opcode_length(opcode_length[*i*]))

[Definition 15]
Length of group sub-field is defined for all the instructions as follows (step St43).

opcode_sub_grp_length[*i*]=opcode_length[*i*]−op-code_sub_idx_length[*i*]

Figure 13:
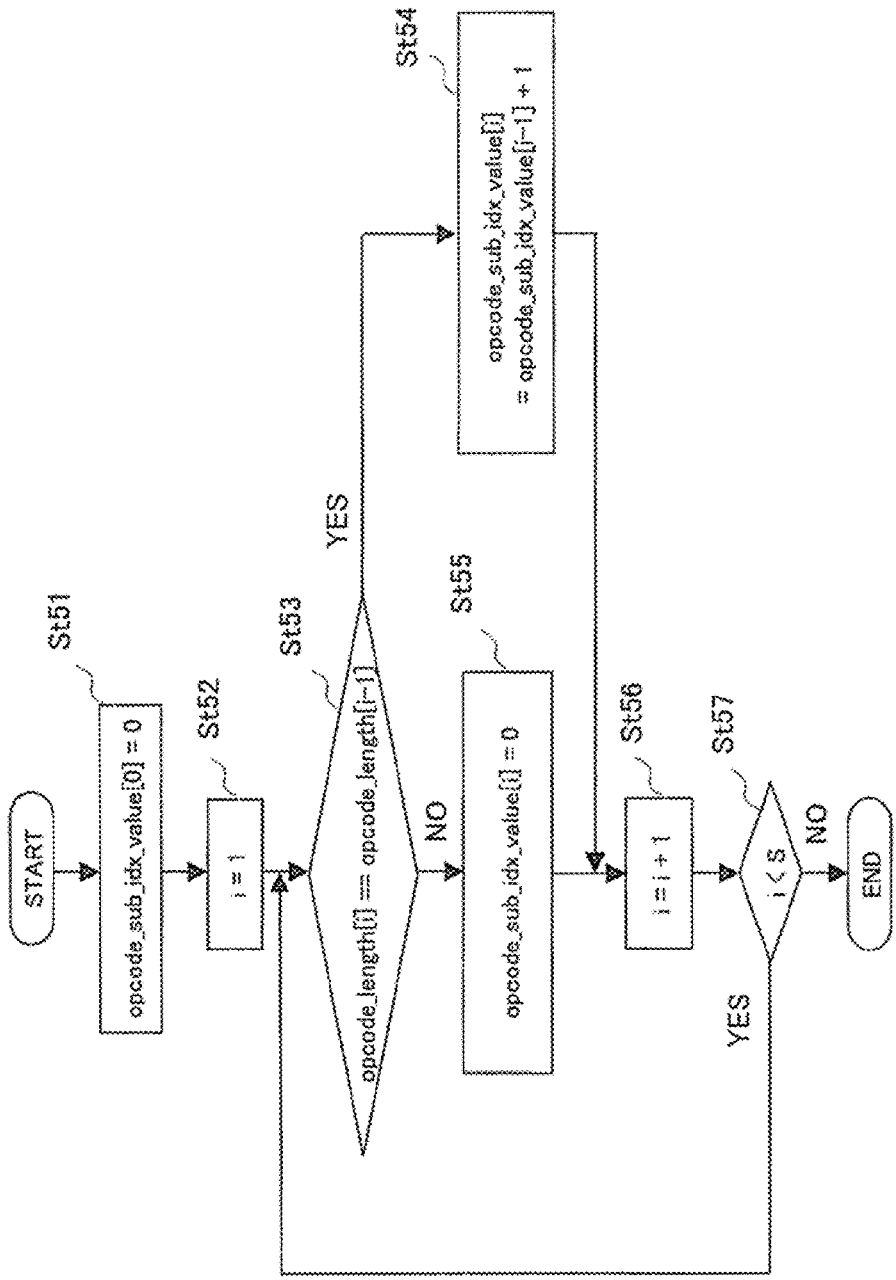
FIG. 13 is a flowchart of an index sub-field decision method according to the fourth operation code decision method.

Next, a procedure of deciding the value of the index sub-field will be described. FIG. 13 is a flowchart corresponding to this procedure. In FIG. 13, i represents the instruction number, S represents the total number of instructions, opcode_value[i] represents the value of the operation code of the instruction i, opcode_length[i] represents the bit width of the operation code of the instruction i, and opcode_sub_idx_value[i] represents the value of the index sub-field of the instruction i.

0 is assigned to opcode_sub_idx_value[0] (step St51).

Then, opcode_sub_idx_value[i] is sequentially decided as follows with the instruction number i ranging from 1 to S−1 (step St52 to St57).

In step St53, it is determined whether opcode_length[i] is equal to opcode_length[i−1].

When opcode_length[i] is equal to opcode_length[i−1] (Yes in step St53), 1 is added to opcode_sub_idx_value[i−1], and the value obtained from the addition is assigned to opcode_sub_idx_value[i] (step St54).

On the other hand, when opcode_length[i] is not equal to opcode_length[i−1] (No in step St53), 0 is assigned to opcode_sub_idx_value[i] (step St55).

Next, a procedure of sorting instructions based on the bit width of each group sub-field will be described. All instructions are sorted based on the group sub-field length opcode_sub_grp_length[i] of the instruction i. The instruction number after the sorting is represented by n. Let the number n of the instruction that uses the largest number of bits for the group sub-field be set to 0, and let the number n of the instruction that uses the smallest number of bits for the operand be set to S−1.

Figure 14:
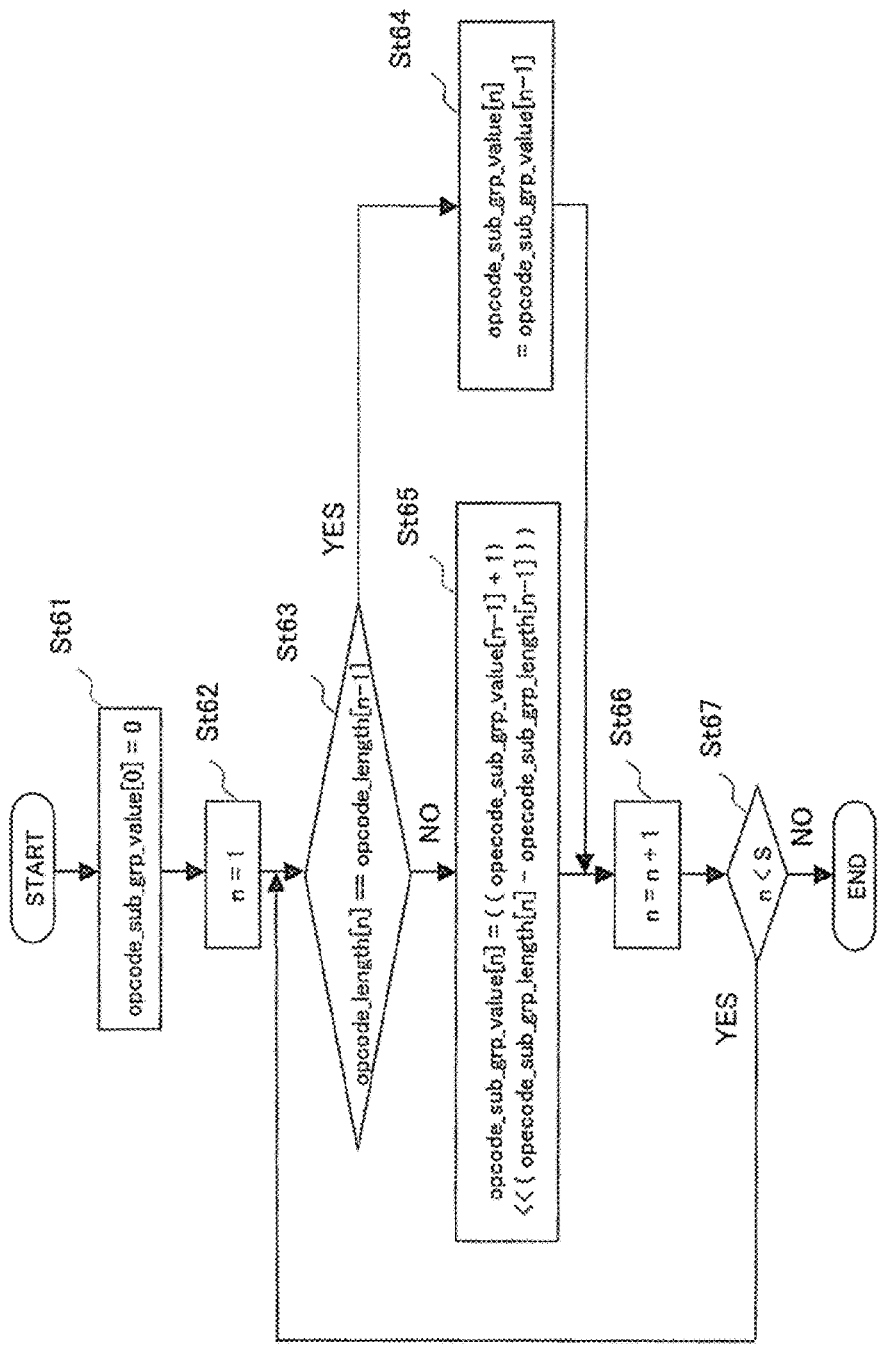
FIG. 14 is a flowchart of a group sub-field decision method according to the fourth operation code decision method.

Next, a procedure of deciding the value of the group sub-field will be described. FIG. 14 is a flowchart corresponding to this procedure. In FIG. 14, n represents the instruction number, S represents the total number of instructions, opcode_value[n] represents the value of the operation code of the instruction n, opcode_length[n] represents the bit width of the operation code of the instruction n, opcode_sub_grp_value[n] represents the value of the group sub-field of the instruction n, and opcode_sub_grp_length[n] represents the bit width of the group sub-field of the instruction n.

0 is assigned to opcode_sub_grp_value[0] (step St61).

Then, opcode_sub_grp_value[n] is sequentially decided as follows with the instruction number n ranging from 1 to S−1 (step St62 to St66).

In step St63, it is determined whether opcode_length[n] is equal to opcode_length[n−1].

When opcode_length[n] is equal to opcode_length[n−1] (Yes in step St63), opcode_sub_grp_value[n−1] is assigned to opcode_sub_grp_value[n] (step St64).

On the other hand, when opcode_length[n] is not equal to opcode_length[n−1] (No in step St63), opcode_sub_grp_value[n] is calculated according to a calculation formula:

opcode_sub_grp_value[*n*]=((opcode_sub_grp_value[*n*−1]+1)<<(opcode_sub_grp_length[*n*]−op-code_sub_grp_length[*n*−1]).

In this manner, the value of the operation code of each instruction is decided.

Examples of assignment of the operation code according to the fourth operation code decision method are shown in FIGS. 15 to 18.

FIG. 15 represents bit patterns of 14 instructions (S=14). In FIG. 15, Ra, Rb, and Rc are operand fields each represent a register number. IMM6, IMM4, and IMM2 are operand fields each representing a numerical value. The word length of each instruction is 16-bit (N=16). The operand is arranged on the LSB side of the instruction bit pattern, and operation code filed is arranged on the MSB side of the instruction bit pattern.

The instructions shown in FIG. 15 as the specification code are sorted based on opcode_length[i], and the processing from St51 to St57 of FIG. 13 is executed, whereby FIG. 16 is obtained. FIG. 16 shows the value of each index sub-field corresponding to the instructions of FIG. 15.

Subsequently, the instructions of FIG. 16 in which the value of each index sub-field has been calculated is used to calculate the bit width of the group sub-field of each instruction. Then, the instructions are sorted based on the bit width of each group sub-field and, thereby, FIG. 17 is obtained.

Subsequently, the processing from step St61 to step St67 of FIG. 14 is executed for the instructions of FIG. 17 and, thereby, FIG. 18 is obtained. FIG. 18 shows the value of each group sub-field corresponding to the instructions of FIG. 17. With the above processing, the values of the index sub-field and group sub-field of each instruction are calculated. Then, the index sub-field and group sub-filed are connected, whereby the bit string corresponding to the value of the operation code is obtained.

As shown in FIG. 18, the value of operation code of each instruction constituted by the value "opcode_sub_grp_value[i] (i=0, . . . , 13)" of group sub-field and value "opcode_sub_idx_value[i] (i=0, . . . , 13)" of index sub-field does not overlap the value of operation code of any other instruction. Thus, it is possible to correctly identify each instruction with the operation code according to this operation code decision method.

The operation code generated by the fourth operation code decision method is constituted by a bit string representing a group of operation codes having the same bit width and bit string representing the index of an instruction in the group. This is the same feature as the second operation code decision method. Thus, the operation code can easily be decoded as in the case of the second operation code decision method. It is not necessary to execute a subtraction in order to decode the operation code generated in the second operation code decision method, so that the operation code can be decoded only with a logical operation and shift operation.

Further, the operation code generated by the fourth operation code decision method has a feature that the group sub-field of a shorter operation code does not coincide with part of the group sub-field of another longer operation code. This is a feature that the second operation code decision method does not have. This makes the decoding processing easier than in the case of the second operation code decision method.

That is, when the operation code generated in the second operation code decision method is decoded, the bit string representing a group of operation codes having the same bit width is first decoded and then the group having the longest bit string needs to be selected. This is because that the bit strings representing a group of operation codes having the same bit width partially coincide with each other, so that it is necessary to select the best suited group from among the bit strings. The number of types of operation code that the fourth operation code decision method can express is small as compared to the case of using the second operation code decision method. However, this is not a major problem in the case where the instruction word length is 24- or 32-bit.

Which any of the above first to fourth operation code decision methods is to be selected will be described.

In general, it is preferable to select an operation code decision method in which the decoding can be easily performed. Among the first to fourth operation code decision methods, the fourth operation code is the easiest in terms of the decoding processing. In the case where the number of operation codes needs to be increased, the second operation code decision method is preferably selected.

Although the present invention has been described in detail with reference to the above examples, it should be understood that the present invention is not limited to the above representative examples. Thus, various modifications, changes, and applications may be made by those skilled in the art without departing from the true scope of the invention as defined by the appended claims. Accordingly, all of the modifications and the equivalents thereof are included in the scope of the present invention.

[Modifications]

Although the operation code is arranged on the MSB side of the bit pattern of each instruction in the above examples, the operation code may be arranged on the MSB side, LSB side, or intermediate position of the bit pattern of each instruction. Further, the operation code may be arranged in a divided manner in the bit pattern of each instruction.

[Applications]

The examples of the present invention may be applied to a processor hardware configuration generation tool or processor software development tool as disclosed in Patent Citation 3. Such a tool generates a hardware configuration or software development tool based on specification of a processor. The processor specification includes specification of an instruction set. Although the specification of the instruction set includes a bit width or value of the operation code in Patent Citation 3, a use of the examples of the present invention allows the bit width and value to be automatically decided. This results in an application where a hardware configuration or software development tool for correctly decoding or encoding the decided operation code is generated.

When at least a part of functions of the above means constituting the instruction operation code generation system according to the examples of the present invention is realized using a program code of a computer, the program code and a computer-readable recording medium for recording the program are included in the category of the present invention. The program code may be of any type as long as it can allow the computer to realize the functions of the above means. For example, the program code may realize the functions in cooperation with another program code such as an OS (operating System). Examples of the recording medium for recording the program code include any type of recording medium such as a semiconductor memory such as an ROM (Read Only Memory), as well as, a disk-shaped recording medium (magnetic disk, optical disk, magnet-optical disk, etc., such as a hard disk drive), and a tape-shaped recording medium.

Further, the computer executing an instruction of the program code constituting the instruction operation code generation system according to the examples of the present invention is included in the category of the present invention. The computer can be constituted by using at least a part of a processor (CPU) operating in accordance with a control program, a memory having a storage area for storing a control program or control data, and various peripheral devices including various I/O devices (e.g., external recording device such as a hard disk), communication devices such as a communication modem or LAN (local area network) interface, display devices such as a CRT (cathode ray tube) and liquid crystal display device, and input devises such as a keyboard and mouse. In this case, the processor, memory, and various I/O devices used for realizing the functions of the above means are included in the category of the present invention. The computer may be of any type such as a stand-alone type computer or a computer system constituted by a plurality of computers communicably connected to a network.

Industrial Applicability

By using the present invention, it is possible to automatically generate the operation code of each instruction from the specification description of an instruction set. The present invention can be applied to a system that generates process or hardware description from the specification description of a processor. In addition, the present invention can be applied to a system that generates a software development tool such as an assembler or compiler from the specification description of an instruction set.

The invention claimed is:

1. A hardware-implemented system for generating an instruction operation code, comprising:
a processor;
an operation code bit width decision section which decides, according to specification data associated with a processor instruction set, a bit width to be assigned for an operation code of each instruction of the processor instruction set based on a width of a bit pattern of all operands of each instruction read out from the specification data in such a way that the bit width to be assigned for the operation code of each instruction is decided to be a difference which is obtained by subtracting the width of the bit pattern of all operands of said each instruction from a word length of said each instruction;
an instruction classification section which rearranges the instructions within said processor instruction set in an order which accords to the operation code bit width; and
an operation code value decision section which decides a value of the operation code of each instruction according to the operation code bit width and a rearranged sequence of the instructions.

2. The system according to claim 1, further comprising:
a specification data analysis section which interprets the specification data; and
an intermediate data storage section which stores data output by the specification data analysis section, the operation code bit width decision section, the instruction classification section, and the operation code value decision section.

3. The system according to claim 2, wherein
the operation code value decision section includes a section which divides the operation code into two sub-fields and decides a value of each sub-field according to the operation code bit width and the sorted sequence of the instructions.

4. The system according to claim 2, wherein
the specification data associated with the processor instruction set includes a word length of the instruction, a number of operands included in the instruction, and a bit width of each operand, and
the operation code value decision section determines the operation code of each instruction
according to the specification data associated with the processor instruction set including the word length of the instruction, the number of operands included in the instruction, and the bit width of each operand.

5. The system according to claim 4, wherein
assuming that a number of each instruction is k, a total number of the instructions is S, the word length of each instruction is N, a width of a bit pattern used for representing all operands of the instruction k is total_operands_length[k], a width of an operation code field of the instruction k is opecode_length[k] bit, a value of the operation code field of the instruction k is opcode_value[k], a number of instructions in which the length of the operation code field is x bits is num_of inst_having_opcode_length(x), and a minimum value of power of two that is not less than the value x is min_power_of 2(x),
the operation code bit width decision section calculates the bit width "opcode_length[k]" of the operation code field of the instruction k according to a calculation formula: opcode_length[k]=N−total_operands_length[k] (k=0, 1, . . . , S−1),
the instruction classification section sorts all the instructions based on the width "total_operands_length[k]" of a bit pattern used for representing all operands of the instruction k, and
assuming that the instruction number after the sorting is i, the number i of the instruction that uses the largest number of bits for the operand is 0, and the number i of the instruction that uses the smallest number of bits for the operand is S−−1,
the operation code value decision section decides the value "opcode_value[i]" of the operation code field of the instruction i in an order starting from 0-th instruction to (S-1)-th instruction.

6. The system according to claim 5, wherein
the operation code value decision section for deciding the value "opcode_value[i]" of the operation code of the instruction i assigns 0 to opcode_value[0] and then sequentially decides the value "opcode_value[i]" while changing the instruction number i from 1 to S−1 according to opcode_value[i]=((opcode_value[i−1]+1)<<(opcode_length[i]−opcode_length[i−1]).

7. The system according to claim 5, wherein
the operation code value decision section for deciding the value "opcode_value[i]" of the operation code field of the instruction i assigns 0 to opcode_value[0] and then sequentially decides the value "opcode_value[i]" while changing the instruction number i from 1 to S−1 as follows:
(1) when opcode_length[i] is equal to opcode_length[i−1], the operation code value decision section decides the value "opcode_value[i]" according to opcode_value[i]=opcode_value[i−1]+1; and
(2) when opcode_length[i] is not equal to opcode_length [i-1], the operation code value decision section compares a value "min_power_of 2(num_of_inst_having_opcode_length(opcodelength[i]))" which is the minimum value of power of two that is not less than the number of instructions having the same operation code length as the instruction i and a value obtained from (1<<opcode_length[i]−opcode_length[i−1]) so as to set larger one to Z and decides the value "opcode_value[i]" according to "opcode_value[i]=((opcode_value[i−1]<<(opcode_length[i−1]))+Z)&(~(Z−1)).

8. The system according to claim 5, wherein the operation code value decision section for deciding the value "opcode_value[i]" of the operation code field of the instruction i assigns 0 to opcode_value[0] and then sequentially decides the value "opcode_value[i]" while changing the instruction number i from 1 to S−1 as follows:
(1) when opcode_length[i] is equal to opcode_length[i−1], the operation code value decision section decides the value "opcode_value[i]" according to opcode_value[i]= opcode_value[i−1]+1; and
(2) when opcode_length[i] is not equal to opcode_length [i−1], the operation code value decision section sets to Z a value "(min_power_of_2(num_of inst_having_opcode_length(opcode_length[i−1]))", which is the minimum value of power of two that is not less than the number of instructions having the same operation code length as the instruction i, and decides the value "opcode_value[i]" according to "opcode_value[i]= ((opcode_value[i−1]+Z<<(opcode_length[i]−opcode_length[i−1])).

9. The system according to claim 5, wherein
the operation code field is divided into a group sub-field and an index sub-field,
the operation code value decision section for deciding the value "opcode_value[i]" of the operation code field of the instruction i includes an index sub-filed value decision section which decides the value of the index sub-field and a group sub-field value decision section which decides the value of the group sub-field,
assuming that the length of the index sub-field of the instruction i is opcode_sub_idx_length[i], the value of the index sub-field of the instruction i is opcode_sub_idx_value[i], the length of the index sub-field is defined for all the instruction by opcode_sub_idx_length[i]=min_power_of 2(num_of_inst_having_opcode_length(opcode_length[i])), the length of the group sub-field of the instruction i is opcode_sub_grp_length [i], the value of the group sub-field of the instruction i is opcode_sub_grp_value[i], the length of the group sub-field is defined for all the instruction by opcode_sub_grp_length[i]=opcode_length[i]−opcode_sub_idx_length [i], the index sub-filed value decision section assigns 0 to opcode_sub_idx_value[0] and then sequentially decides the value "opcode_sub_idx_value[i]" while changing the instruction number i from 1 to S−1 as follows:
(1) when opcode_length[i] is equal to opcode_length[i−1], the index sub-filed value decision section decides the value "opcode_sub_idx_value[i]" according to opcode_sub_idx_value[i]=opcode_sub_idx_value[i−1]+1; and
(2) when opcode_length[i] is not equal to opcode_length [i−1], the index sub-filed value decision section decides the value "opcode_sub_idx_value[i]" according to opcode_sub_idx_value[i]=0,
all the instructions are sorted based on the length "opcode_sub_grp_length[i] of the group sub-field of the instruction i, and
assuming that the instruction number after the sorting is n, the number n of the instruction that uses the largest number of bits for the operand is 0, and the number n of the instruction that uses the smallest number of bits for the operand is S−1,
the group sub-field value decision section assigns 0 to opcode_sub_grp_value[0] and then sequentially decides the value "opcode_sub_grp_value[n]" while changing the instruction number n from 1 to S−1 as follows:
(1) when opcode_length[n] is equal to opcode_length[n−1], the group sub-field value decision section decides the value "opcode_sub_grp_value[n]" according to opcode_sub_grp_value[n]=opcode_sub_grp_value [n−1] ; and (2) when opcode_length[n] is not equal to opcode_length[n−1], the group sub-field value decision section decides the value "opcode_sub_grp_value[n]" according to opcode_sub_grp_value[n]=((opcode_sub_grp_value[n−1]+1)<<(opcode_sub_grp_length[n]−opcode_sub_grp_length[n−1])).

10. The instruction operation code generation system according to claim 3,
wherein the operation code value decision section determines the length of each sub-field for the instructions based on how many instructions having the same operation code bit width are included in the instructions.

11. An instruction operation code generation method, comprising:
a specification data analysis step of interpreting specification data associated with a processor instruction set;
a step of deciding a bit width to be assigned for an operation code of each instruction of the processor instruction set based on a width of a bit pattern of all operands of each instruction read out from the specification data in such a way that the bit width to be assigned for the operation code of each instruction is decided to be a difference which is obtained by subtracting the width of the bit pattern of all operands of said each instruction from a word length of said each instruction;
a step of rearranging the instructions within said processor instruction set in an order which accords to the operation code bit width; and
a step of deciding a value of the operation code of each instruction according to the operation code bit width and a rearranged sequence of the instructions, the above respective steps are executed according to the specification data associated with the processor instruction set.

12. The instruction operation code generation method according to claim 11, wherein
the operation code value decision step includes a step of dividing the operation code into two sub-fields and deciding a value of each sub-field according to the operation code bit width and the sorted sequence of the instructions.

13. The instruction operation code generation method according to claim 11, wherein
the specification data associated with the processor instruction set includes a word length of the instruction, a number of operands included in the instruction, and a bit width of each operand, and
the operation code value decision step determines the operation code of each instruction according to the specification data associated with the processor instruction set including the word length of the instruction, the number of operands included in the instruction, and the bit width of each operand.

14. A non-transitory computer-readable recording medium storing an instruction operation code generation program for allowing a computer to execute an instruction operation code method, the method comprising:
a specification data analysis step of interpreting specification data associated with an instruction set of a processor;
a step of, according to specification data associated with a processor instruction set, deciding a bit width to be assigned for an operation code of each instruction of the processor instruction set based on a width of a bit pattern of all operands of each instruction read out from the specification data in such a way that the bit width to be assigned for the operation code of each instruction is decided to be a difference which is obtained by subtracting the width of the bit pattern of all operands of said each instruction from a word length of said each instruction;
a step of rearranging the instructions within said processor instruction set in an order which accords to the operation code bit width; and
a step of deciding a value of the operation code of each instruction according to the operation code bit width and a rearranged sequence of the instructions,
wherein the above respective steps are executed according to the specification data associated with the processor instruction set.

15. A non-transitory computer-readable recording medium storing an instruction operation code generation program for allowing a computer to execute a method for generating at least one of a hardware configuration definition of a processor and a software development tool of the processor based on specification data associated with instructions of the processor, said method comprising:
a specification data analysis step of interpreting specification data associated with an instruction set of a processor;
a step of, according to specification data associated with a processor instruction set, deciding a bit width to be assigned for an operation code of each instruction of the processor instruction set based on a width of a bit pattern of all operands of each instruction read out from the specification data in such a way that the bit width to be assigned for the operation code of each instruction is decided to be a difference which is obtained by subtracting the width of the bit pattern of all operands of said each instruction from a word length of said each instruction; and
a step of rearranging the instructions within said processor instruction set in an order which accords to the operation code bit width;
a step of deciding a value of the operation code of each instruction according to the operation code bit width and a rearranged sequence of the instructions;
wherein the above respective steps are executed according to the specification data associated with the processor instruction set,
and said method further comprises a step of generating at least one of encoder and decoder respectively for encoding and decoding instructions in the instruction set generated by the instruction operation code generation system, said at least one of the encoder and decoder is included in at least one of the hardware configuration definition of a processor and the software development tool of the processor.

16. A hardware implemented system for generating at least one of a hardware configuration definition of a processor and a software development tool of the processor based on specification data associated with instructions of the processor, comprising:
an instruction operation code generation system, comprising:
an operation code bit width decision section which decides, according to specification data associated with a processor instruction set, a bit width to be assigned for an operation code of each instruction of the processor instruction set based on a width of a bit pattern of all operands of each instruction read out from the specification data in such a way that the bit width to be assigned for the operation code of each instruction is decided to be a difference which is obtained by subtracting the width of the bit pattern of all operands of said each instruction from a word length of said each instruction;

an instruction classification section which rearranges the instructions within said processor instruction set in an order which accords to the operation code bit width; and an operation code value decision section which decides a value of the operation code of each instruction according to the operation code bit width and a rearranged sequence of the instructions, wherein the processor generates at least one of encoder and decoder respectively for encoding and decoding instructions in the instruction set generated by the instruction operation code generation system, said at least one of the encoder and decoder is included in at least one of the hardware configuration definition of a processor and the software development tool of the processor.

* * * * *